US007756322B2

(12) United States Patent  
Saitou et al.

(10) Patent No.: US 7,756,322 B2  
(45) Date of Patent: Jul. 13, 2010

(54) PICTURE TAKING MOBILE ROBOT

(75) Inventors: Youko Saitou, Wako (JP); Koji Kawabe, Wako (JP); Yoshiaki Sakagami, Wako (JP); Tomonobu Gotou, Wako (JP); Takamichi Shimada, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1316 days.

(21) Appl. No.: 10/914,338

(22) Filed: Aug. 10, 2004

(65) Prior Publication Data

US 2005/0041839 A1    Feb. 24, 2005

(30) Foreign Application Priority Data

Aug. 18, 2003  (JP)  ............................. 2003-294419  
Aug. 18, 2003  (JP)  ............................. 2003-294424  
Aug. 18, 2003  (JP)  ............................. 2003-294427  
Aug. 18, 2003  (JP)  ............................. 2003-294430

(51) Int. Cl.  
*G06K 9/00*  (2006.01)

(52) U.S. Cl. ......................... 382/153; 382/103; 382/118

(58) Field of Classification Search .................. 340/541  
See application file for complete search history.

(56) References Cited

U.S. PATENT DOCUMENTS 5,045,769 A * 9/1991 Everett, Jr. .................. 320/107  
5,323,470 A * 6/1994 Kara et al. ................... 382/103  
5,841,258 A * 11/1998 Takenaka ................ 318/568.12  
5,912,980 A * 6/1999 Hunke ......................... 382/103  
6,535,793 B2 * 3/2003 Allard ......................... 700/259  
6,812,835 B2 * 11/2004 Ito et al. ...................... 340/541

(Continued)

FOREIGN PATENT DOCUMENTS

JP        2001-125641 A        5/2001

(Continued)

OTHER PUBLICATIONS

"What's New: ASIMO," Nikkei Electronics, Jan. 6, 2003, pp. 24-25.

(Continued)

*Primary Examiner*—Vu Le  
*Assistant Examiner*—Claire Wang  
(74) *Attorney, Agent, or Firm*—Squire, Sanders & Dempsey, LLP

(57) ABSTRACT

A mobile robot that is fitted with a camera and can be controlled from a remote terminal such as a mobile phone moves about in an event site to detect and track a moving object such as a visitor and entertainer. Because the camera along with the robot itself can change its position freely autonomously and/or according to a command from the mobile terminal, a desired frame layout can be accomplished by moving the position of the robot. Therefore, the operator is not required to execute a complex image trimming process or other adjustment of the obtained picture image so that a desired picture can be obtained quickly and without any difficulty. If the user is allowed access the managing server, the user can download the desired picture images and have them printed out at will. Also, because the selected picture images can be transmitted to the managing server, the robot is prevented from running out of memory for storing the picture images.

14 Claims, 19 Drawing Sheets

U.S. PATENT DOCUMENTS

| | | | |
|---|---|---|---|
| 6,856,696 B1* | 2/2005 | Ajioka | 382/173 |
| 7,200,260 B1* | 4/2007 | Watanabe et al. | 382/153 |
| 2001/0026634 A1* | 10/2001 | Yamaguchi | 382/118 |
| 2002/0147661 A1* | 10/2002 | Hatakama et al. | 705/26 |
| 2003/0146976 A1* | 8/2003 | Liu | 348/207.1 |
| 2004/0062423 A1* | 4/2004 | Doi | 382/118 |
| 2004/0233290 A1* | 11/2004 | Ohashi et al. | 348/187 |
| 2005/0031166 A1* | 2/2005 | Fujimura et al. | 382/103 |
| 2005/0063566 A1* | 3/2005 | Beek et al. | 382/115 |
| 2005/0071047 A1* | 3/2005 | Okabayashi et al. | 700/245 |
| 2005/0117782 A1* | 6/2005 | Imaoka et al. | 382/117 |

FOREIGN PATENT DOCUMENTS

| | | |
|---|---|---|
| JP | 2001-300874 A | 10/2001 |
| JP | 2002-321180 A | 11/2002 |
| JP | 2003-006532 | 1/2003 |
| JP | 2004-242244 A | 8/2004 |
| KR | 2000-0036419 | 7/2000 |

OTHER PUBLICATIONS

"What's New: AIBO," Nikkei Electronics, 2003, pp. 32-33.
Japanese Office Action, JP Application No.: 2003-294419, Date of JP Office Action: Aug. 19, 2008, pp. 1-3.
Japanese Office Action, JP Application No.: 2003-294424, Date of JP Office Action: Aug. 19, 2008, pp. 1-3.
Japanese Office Action, JP Application No.: 2003-294427, Date of JP Office Action: Aug. 19, 2008, pp. 1-3.
Japanese Office Action, JP Application No.: 2003-294430, Date of JP Office Action: Aug. 19, 2008, pp. 1-4.

* cited by examiner

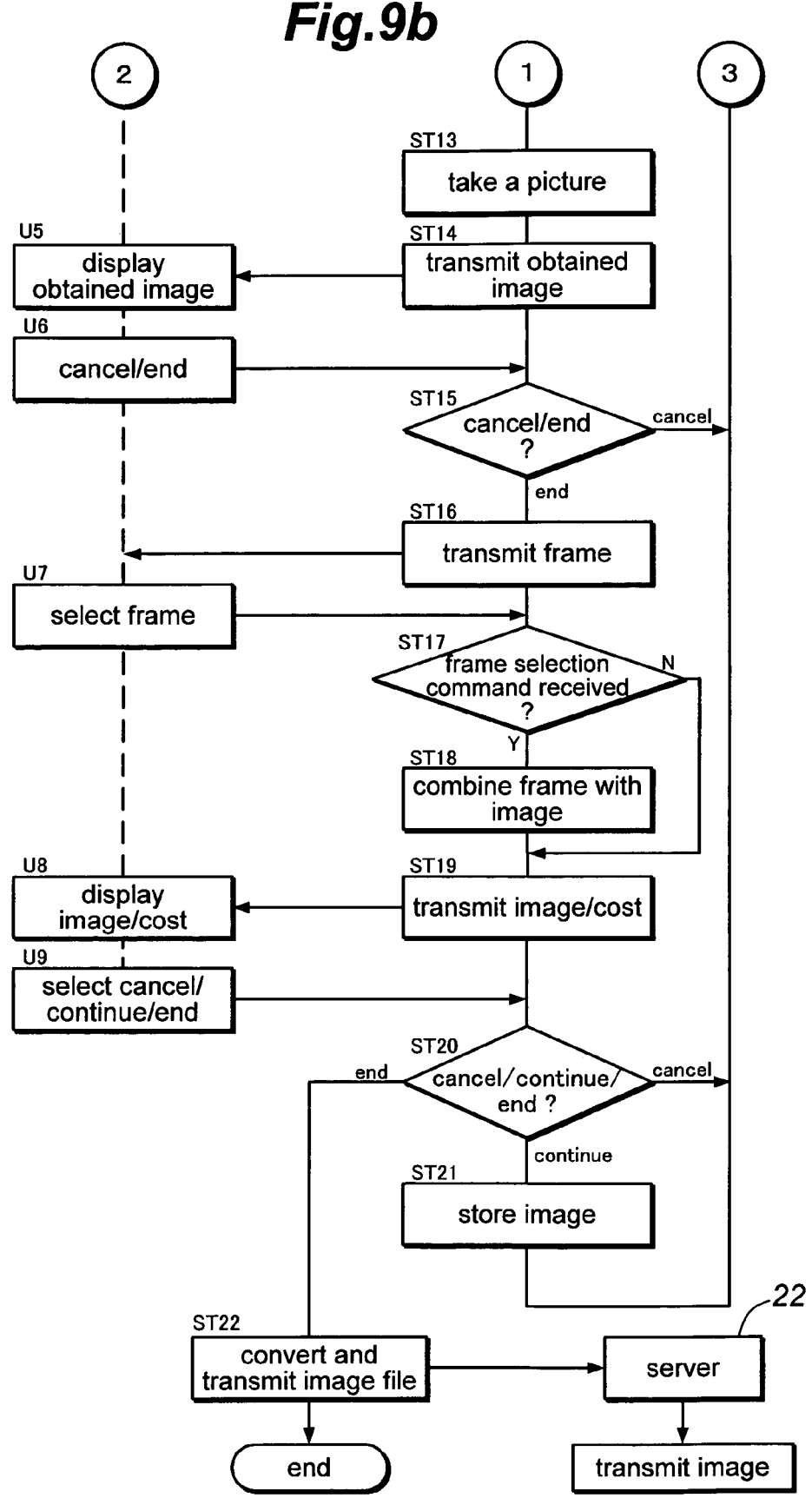

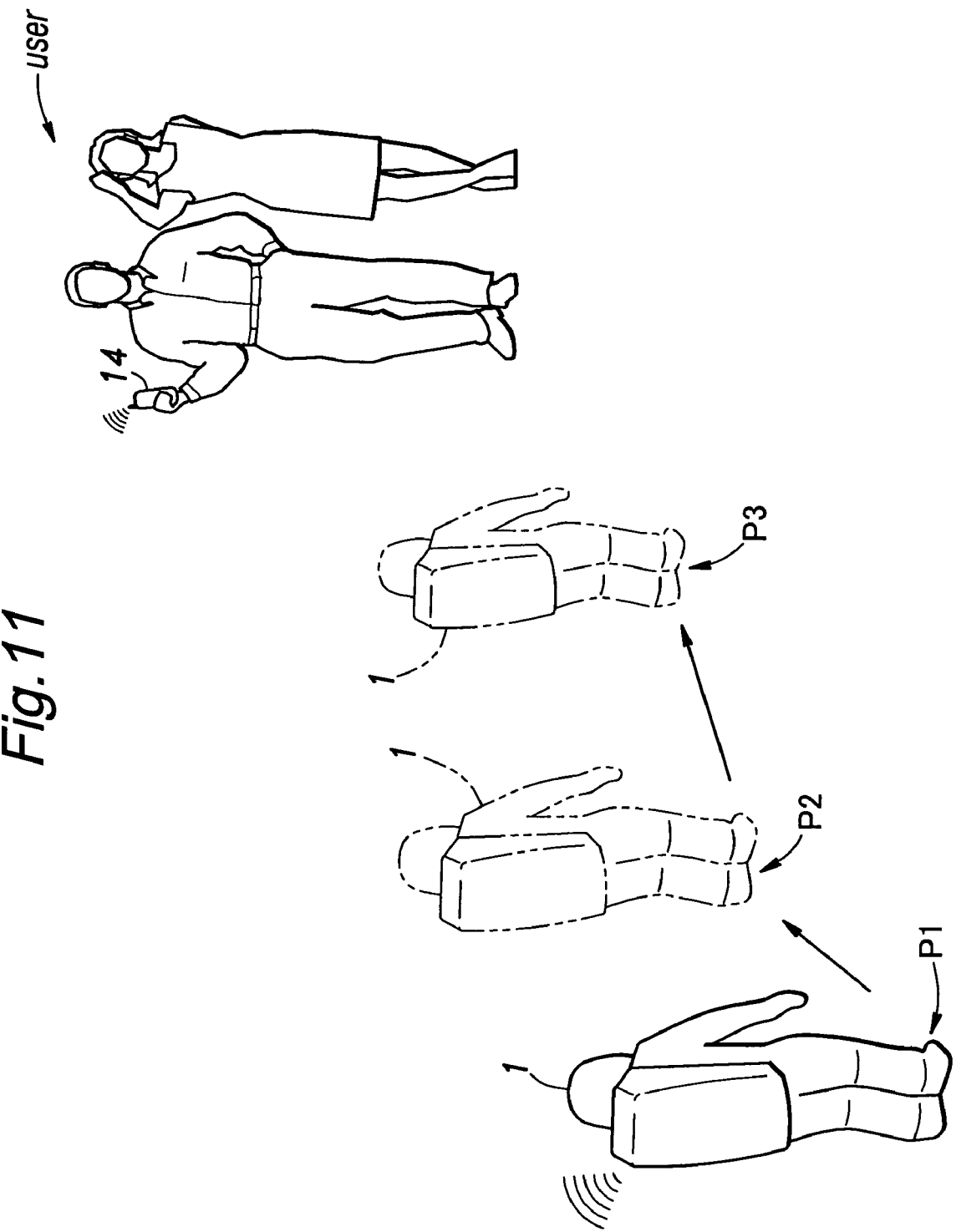

PICTURE TAKING MOBILE ROBOT

TECHNICAL FIELD

The present invention relates to a mobile robot for picture taking that is accessible via a portable or remote terminal.

BACKGROUND OF THE INVENTION

It is known to use a mobile robot to take pictures of objects or persons and transmit the obtained pictures to a remote terminal so that the objects or persons may be observed or monitored from a remote location. The mobile robot may also be controlled from a portable terminal, for instance as disclosed in Japanese patent laid open publication No. 2003-6532. According to the system disclosed in this Japanese patent publication, a robot control server and a portable terminal as well as the robot are connected to a network so that an operator may give instructions to the robot from the portable terminal via the robot control server.

According to this proposal, a control program is stored in the robot control server, and the operator is enabled to control the operation of the robot with the aid of this control program. The Japanese patent publication also discloses the possibility of using a personal computer instead of a portable terminal. In this case, the robot stands on a stage, and the image of the scene surrounding the robot is acquired by a camera placed above the stage to display it on the portable terminal. The robot is also equipped with a camera, but is not used for controlling the robot but only for the purpose of confirming how the robot is executing the instructions.

In certain situations, it is desirable to have a robot take pictures of moving objects. In such a case, the robot is required to be capable of searching for and tracking the objects. For instance, in an amusement park or an event site, an entertainer in a costume of a cartoon character, animal or the like moves about within the site to play with children, and the robot may be instructed to follow the entertainer to allow an operator in a remote location to monitor how the entertainer is performing. However, the conventional system is inadequate for such a purpose because the robot is capable of moving about only along a path prescribed by the robot control server, and not capable of searching for a moving object by itself.

Also, it is desirable if the robot is able to take a picture of an object such as an entertainer and guest in a proper frame layout. For instance, it may be desirable if the object to be located in a proper relationship with the background or in the center of the viewing angle of the camera. The robot could urge the object to move in a particular direction to achieve a desired frame layout. It would be particularly desirable if the robot takes pictures of the object by itself while allowing the pictures that are taken to be displayed on a remote terminal for the user to monitor the layout of each picture that is taken so that a frame layout that is acceptable to the user may be selected with a minimum amount of effort on the part of the user.

In places like amusement parks and event sites, a plurality of robots may be deployed within the site with the task of taking the pictures of the visitors possibly with entertainers in costume. Additionally, visitors may wish to photographed with a robot. In such a case, it would be difficult to have a first robot to be positioned as a cameraman and have a visitor or user join a second robot so that the visitor may be photographed with the second robot in a desired frame layout.

The prior art is only capable of instructing the robot to move in a particular direction and stand at a particular spot, and a considerable amount of time would be necessary to achieve such a desired layout of the object.

BRIEF SUMMARY OF THE INVENTION

In view of such problems of the prior art and recognition of the inventors, a primary object of the present invention is to provide an image capturing system for taking a picture of an object which can look for the object and take a picture thereof in a desired frame layout according to a command from a remote terminal.

A second object of the present invention is to provide an image capturing system which can look for a human and take a picture thereof in a desired frame layout according to a command from a remote terminal.

A third object of the present invention is to provide an image capturing system using a mobile robot carrying a camera whose movement can be controlled from a remote terminal.

A fourth object of the present invention is to provide an image capturing system using a mobile robot which can communicate with another robot and take a picture of a visitor or user standing or sitting next to the other robot.

According to the present invention, at least part of these objects can be accomplished by providing an image capturing system for taking a picture of a mobile object, comprising: a mobile robot, the mobile robot including a wireless transceiver, a camera and a control unit connected to the wireless transceiver and camera; and a managing server; wherein the control unit is adapted to temporarily store a plurality of picture images obtained by the camera, transmit the obtained picture images to a mobile terminal incorporated with a display via the wireless transceiver, and transmit a selected one of the pictures images according to a request signal transmitted from the mobile terminal to the managing server.

According to this arrangement, because the camera along with the robot itself can change its position freely autonomously and/or according to a command from the mobile terminal, a desired frame layout can be accomplished by moving the position of the robot. Therefore, the operator is not required to execute a complex image trimming process or other adjustment of the obtained picture image so that a desired picture can be obtained quickly and without any difficulty. If the user is allowed access the managing server, the user can download the desired picture images and have them printed out at will. Also, because the selected picture images can be transmitted to the managing server, the robot is prevented from running out of memory for storing the picture images.

Also, the robot may be adapted to find and track a moving object such as a human while allowing a relatively precise movement control of the robot from a mobile terminal, a desired frame layout can be obtained with a minimum amount of effort. Preferably, the control unit is adapted to change a position or moving direction of the robot in response to a command from the mobile terminal.

According to a preferred embodiment of the present invention, the control unit includes a means for cutting out an image of a face from at least one of the picture images obtained by the camera and a means for adjusting a picture taking parameter of the camera so as to put the face image within a frame.

Thereby, the control unit is enabled to detect a human according to the obtained face image, and to accurately determine the profile of the human according to a pre-established relationship between the face and remaining part of the human body. Alternatively or additionally, the control unit may be adapted to detect a human by optically or electromagnetically detecting an insignia attached to the human.

When an additional robot is available to be with a user so that the user and robot may be photographed together, it will be highly entertaining to the user. For this purpose, the first robot may be provided with a means for communicating with a second robot while the control unit is adapted to take a picture of a person requesting a picture taking with the second robot.

To further enhance the attractiveness of the taken picture, the control unit may be adapted to transmit a background frame for combining with the obtained picture image to the remote terminal and to superimpose the background frame on the obtained picture image.

The robot is desired to be self-sustaining, but requires replenishing of power source such as electricity and fuel. For this purpose, the system may further comprise a charging station for supplying power to the robot, and the robot is provided with a means for detecting power remaining in the robot and a position of the charging station so that the robot is capable of moving to the charging station and receives a supply of power charge before the power of the robot runs out.

To ensure the security of communication between the user and robot, the control unit may be adapted to detect a personal identification signal in the request from the mobile terminal and accept the request only when an authentic personal identification signal is detected in the request from the mobile terminal. Thereby, the user can control the robot and receive picture images without the risk of being disrupted or interfered by a third party.

It is also desirable to automate the process of charging the cost to each user. For this purpose, the control unit may charge a cost to the person requesting a picture taking when the selected picture image is transmitted to the managing server.

BRIEF DESCRIPTION OF THE DRAWINGS

Now the present invention is described in the following with reference to the appended drawings, in which:

FIGS. 9a and 9b show a flow chart of the control process for the second embodiment of the present invention;

FIG. 11 is a view showing a relationship of users with a robot;

DETAILED DESCRIPTION OF THE PREFERRED EMBODIMENTS

Figure 1:
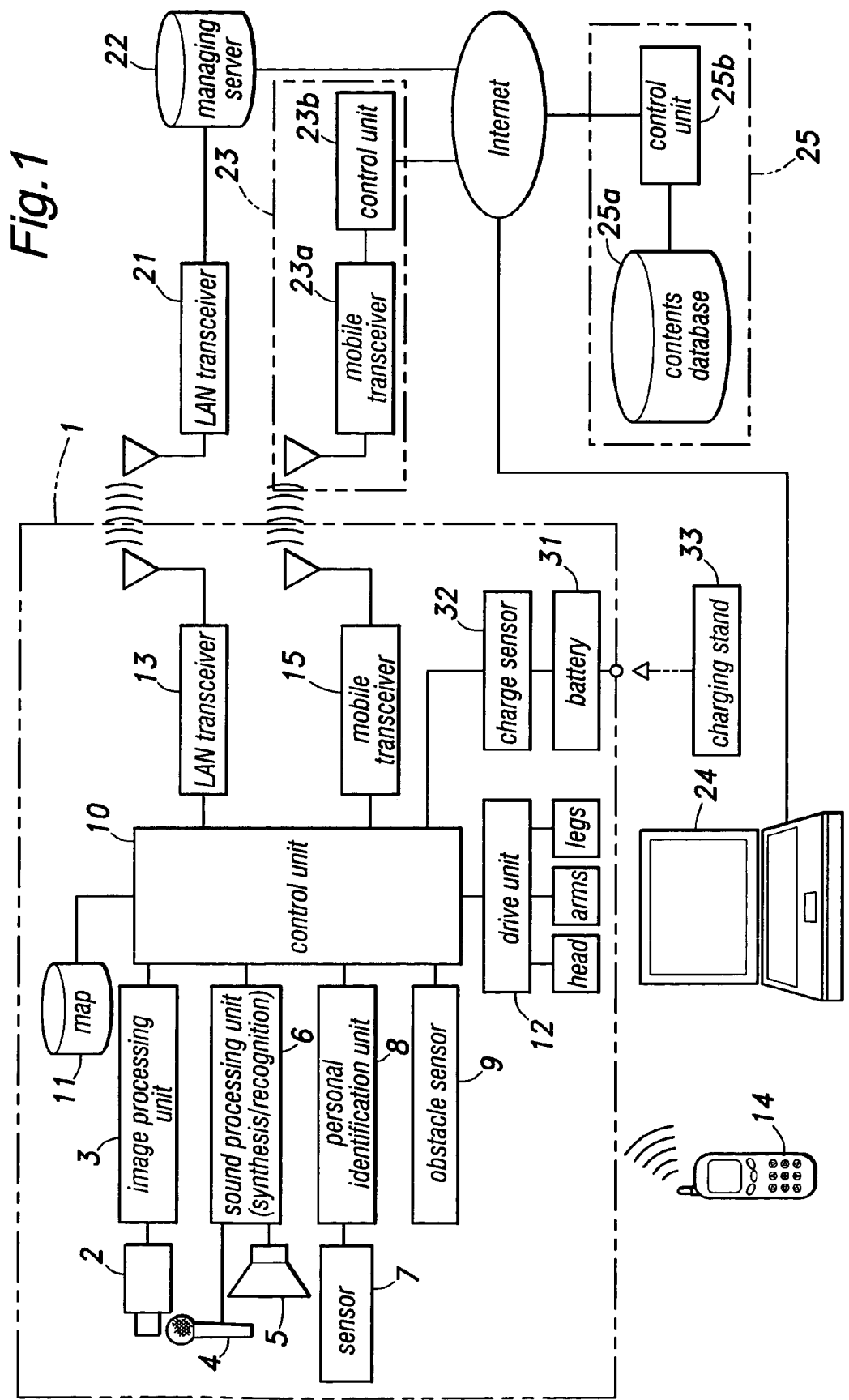
FIG. 1 is an overall block diagram of the picture taking system using a mobile robot according to the present invention.

FIG. 1 is an overall block diagram of a system utilizing the mobile robot for taking pictures of visitors to an amusement park, event site or the like embodying the present invention. In the following description, such visitors are simply referred to as a "user" even though the user may be plural or may not be involved in any control action of the system.

The mobile robot 1 in this embodiment consists of a bipedal robot as such a robot is able to move about in a crowded place without obstructing the movement of the people, but may also take any other form depending on the particular size and layout of the event site in which the robot is used. For instance, the robot may be adapted to move about by using wheels and crawler belts if desired. As shown in the drawing, the mobile robot 1 comprises a pair of cameras 2 arranged in a laterally spaced relationship as a means for capturing an image, an image processing unit 3 connected to the cameras 2, a pair of microphones 4 arranged in a laterally spaced relationship as a means for capturing sound, a sound processing unit 6 connected to the microphones 4, an individual detection sensor 7, a personal identification unit 8 connected to the individual detection sensor 7, an obstacle sensor 9, a control unit 10 receiving signals from the image processing unit 3, sound processing unit 6, personal identification unit 8 and obstacle sensor 9, a map database unit 11 connected to the control unit 10, a drive unit 12 connected to the control unit 10 for controlling the movement of the head, arms and legs of the robot, a LAN transceiver 13 for wireless LAN communication and a mobile transceiver 15 for communication with a mobile phone 14 carried by each individual user. The LAN transceiver 13 and mobile transceiver 15 serve as means for image signal transmission.

The mobile robot 1 also carries a battery 31 as a power source and a charge sensor 32 for detecting the remaining charge of the battery 31. The charge sensor 32 is connected to the control unit 10 so that the charge may be monitored by the control unit 10 at an appropriate timing. A charging stand 33 is placed at an appropriate spot in the event site so that the mobile robot 1 may come to this spot for recharging the battery 31 from time to time. In the illustrated embodiment, the robot is powered by electricity, but may also be powered by other power sources such as fuel, and the charging stand 33 may consist of a pump station in such a case.

The cameras 2 and image processing unit 3, and/or the microphones 4 and sound processing unit 6 form a human detecting means. Additionally or alternatively, an active or passive transponder may be given to a subject person such as an entertainer in a cartoon character or animal costume performing in the event site so that the presence or location of the transponder may be detected by the individual detection sensor 7. It is also possible to stitch or otherwise attach the transponder to the costume.

When a person speaks to the mobile robot 1, it can be detected as a change in the volume of the sound acquired by the microphones 4. The location of the sound source can be determined, for instance, from the differences in the sound pressures and arrival times between the right and left microphones 4. The sound may be recognized as speech by using such techniques as division of sound elements and template matching. When the sound elements associated with changes in the sound volume do not match any of speech sounds or the acquired sound does not match any of the speech sounds in the templates, the sound is not identified as speech. In case of an entertainer in a costume of a cartoon character or animal, a certain sound pattern typical to the character or animal may be used for the recognition of the entertainer.

Figure 2A:
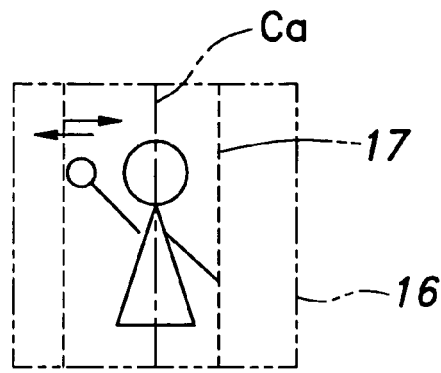
FIGS. 2a and 2b are schematic views showing different modes of movement of a moving object.
Figure 2B:
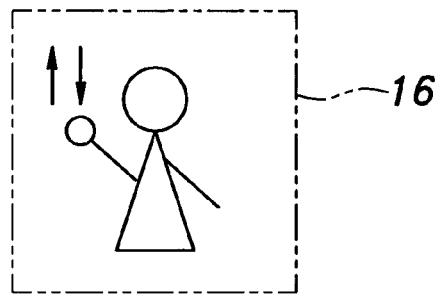

Each camera 2 may consist of a CCD camera, for instance, and is adapted to digitize the image by using a frame grabber before it is forwarded to the image processing unit 3. The cameras 2 and image processing unit 3 may form a movement detecting means, and the image processing unit 3 may be adapted to extract a moving object. For instance, the cameras 2 are directed to a source of sound that is identified as speech by a speech recognition process. If no speech is recognized, the cameras 2 may angularly scan around in arbitrary directions until a moving object such as the one illustrated in FIG. 2 is detected, and the image processing unit 3 may extract the moving object. FIG. 2a shows a costumed entertainer greeting someone by waving a hand, and FIG. 2b shows the entertainer beckoning someone by moving a hand up and down. In such cases, the entertainer is recognized as a moving object on account of the moving hand because the hand movement is most conspicuous, but the whole body of the entertainer may be eventually recognized as a moving object.

Referring to FIGS. 2a and 2b, the process of detecting a moving object is described in the following. The image processing unit 3 determines the distance to a part of the captured image containing a largest number of edge points that are in motion by stereoscopic view. The outline of the moving object is extracted, for instance, by using a dynamic outline extracting process based on the edge information of the image, and the motion is extracted from the difference between two frames which may be adjacent to each other or separated by a prescribed number of frames.

Thereafter, a range of detection $(d\pm\Delta d)$ is defined around a reference distance d, and pixels located within this range are extracted. The number of pixels are counted along each of a number of vertical axial lines that are arranged laterally at a regular interval in FIG. 2a, and the vertical axial line containing the largest number of pixels is defined as a center line Ca of the region for seeking a moving object. A width corresponding to a typical shoulder width of a person is computed on either side of the center line Ca, and the lateral limit of the region is defined according to the computed width. A region 17 for seeking a moving object defined as described above is indicated by dotted lines in FIG. 2a.

Thereafter, a feature of the image is extracted, and it can be accomplished by searching a specific mark or point of attention by using a pattern matching technique. For instance, a recognizable insignia may be stitched to the costume of the entertainer for the robot to track the entertainer by, and the robot is thereby enabled to follow the entertainer substantially without any time delay. It may be arranged such that the entertainer is instructed to respond to the appearance of the robot with a particular one of a number of patterns of hand movement, and the robot may be enabled to identify the entertainer from the detected pattern of hand movement.

The outline of the moving object is extracted. There are a number of known methods for extracting an object (such as a moving object) from given image information. The method of dividing the region based on the clustering of the characteristic quantities of pixels, outline extracting method based on the connecting of detected edges, and dynamic outline model method (snakes) based on the deformation of a closed curve so as to minimize a pre-defined energy are among such methods. An outline is extracted from the difference in brightness between the object and background, and a center of gravity of the moving object is computed from the positions of the points on or inside the extracted outline of the moving object. Thereby, the direction (angle) of the moving object with respect to the reference line extending straight ahead from the robot can be obtained. The distance to the moving object is then computed once again from the distance information of each pixel of the moving object whose outline has been extracted, and the position of the moving object in the actual space is determined. When there are more than one moving object within the viewing angle 16, a corresponding number of regions are defined so that characteristic features may be extracted from each region.

How a face image is cut out is described in the following. This process can be executed by the camera 2, image processing unit 3 and control unit 10. For instance, a small section in an upper part of the moving object is assumed as a face, and color information is extracted from the face which may consist of a part of a costume. If the color information confirms the assumption that the small section is indeed a face, the small section is cut out as a face. An example of an initial image captured by the camera 2 is given in FIG. 3a.

Figure 3A:
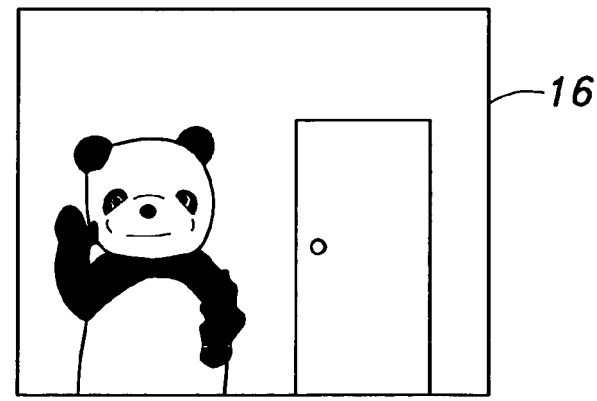
FIG. 3a is a schematic view showing a human (entertainer in costume) which is detected from the picture image.
Figure 3B:
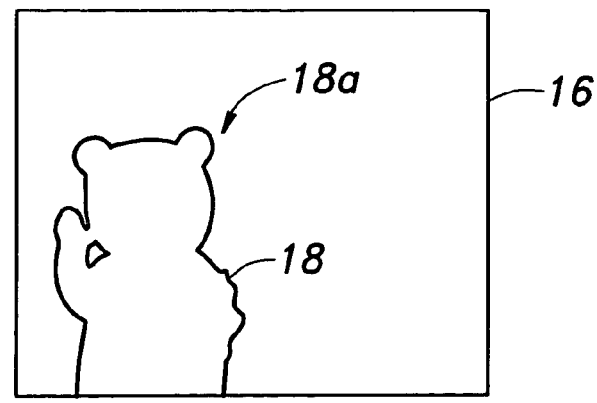
FIG. 3b is an outline of the detected human extracted from the picture image.

When an outline 18 as shown in FIG. 3b is extracted from the image illustrated in FIG. 3a, the positional data for the upper most part of the outline 18 in the image is determined as a top of the head 18a. The image processing unit 3 may be adapted to execute this process. A search area is defined using the top of the head 18a as a reference point. The search area may correspond to the size of the face as seen from the position of the robot 1. A distance range that would permit the identification of a face may also be defined.

When a moving object is not detected, the map database stored in the map database unit 11 is referenced so that the current position may be identified, and a predetermined boundary for the activity of the robot may be verified.

For the robot 1 which is substantially autonomous, a plurality of stationary LAN transceivers 21 are placed in appropriate locations within the boundary for the activity of the robot 1, and these LAN transceivers 21 are linked to a managing server 22. These LAN transceivers 21 are adapted to communicate with the LAN transceiver 13 carried by the robot 1. Also, a mobile communication station 23 is placed in an appropriate spot within the boundary for the activity of the robot 1 to enable communication between a mobile phone 14 carried by the user and a mobile transceiver 15 carried by the robot 1. The mobile communication station 23 includes a transceiver unit 23a and a control unit 23b which are connected to each other, and the control unit 23b is connected to the Internet so that each user may have an access to the mobile communication station 23 via the Internet.

A data server 25 is provided separately from the managing server 22, and comprises a contents database unit 25a and a control unit 25b which are connected to each other. The control unit 25b of the data server 25 is also connected to the Internet.

How the robot 1 takes a picture according to the present invention is described in the following. Consider a situation in which the robot 1 takes pictures of users as digital images by using the camera 2 and gives the taken pictures to the users in an amusement park, event site or the like. In the illustrated embodiment, the cameras 2 are those serving as eyes for the robot 1. Alternatively, the robot 1 may carry a separate camera for taking the pictures. In such a case, the data output terminal of the camera would be connected to the robot 1 to process the captured images with the image processing unit 3. In the following description, a single camera is used for taking the pictures of the users although it may consist of the cameras serving as the eyes for the robot 1.

Figure 4:
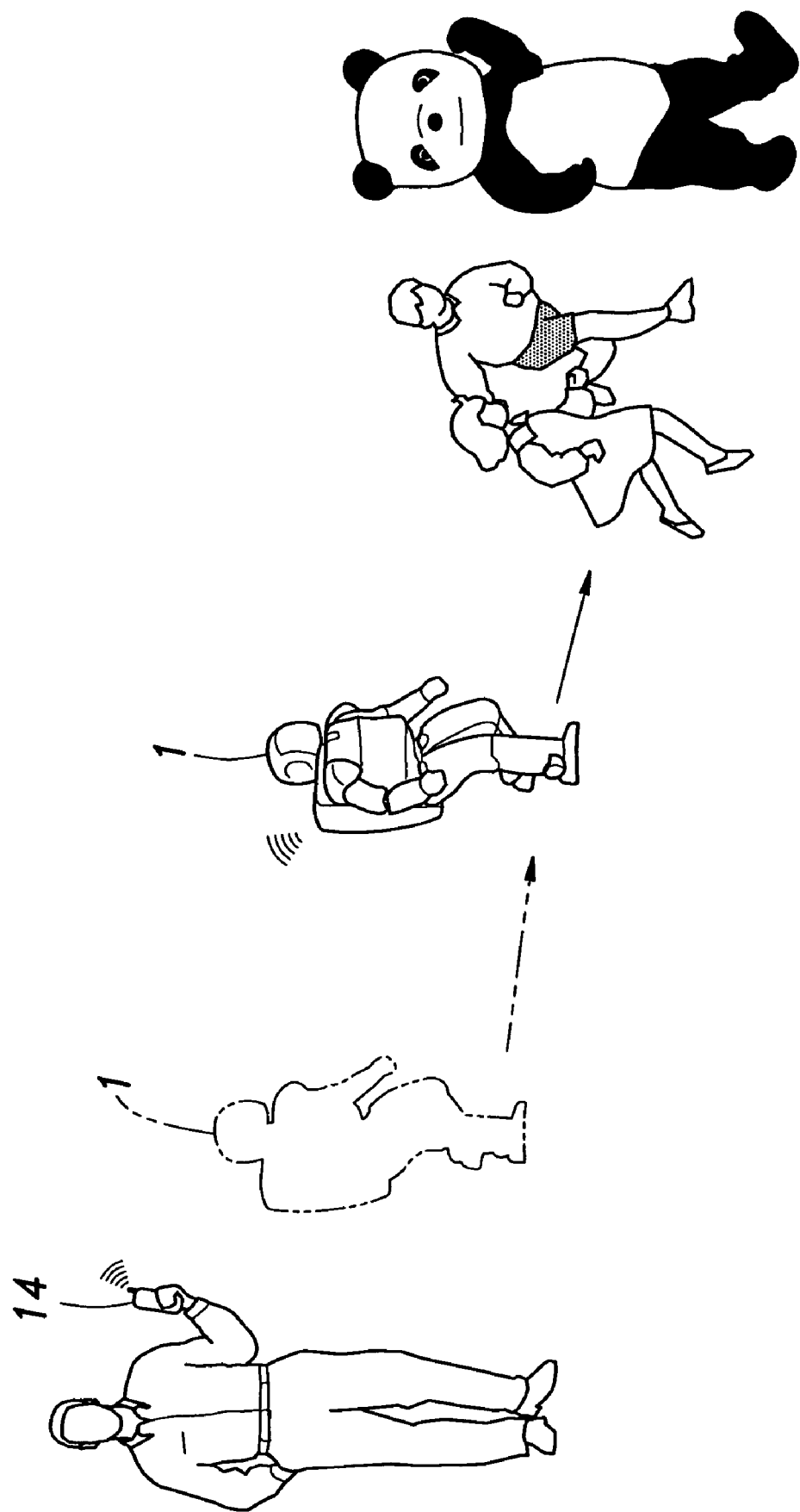
FIG. 4 is a view showing a relationship of humans (two users and one entertainer) to the robot.

Each user can instruct the robot 1 to take his or her picture via a mobile phone 14 which is provided with an image display 14a. The mobile phone 14 may be rented from the administrator of the site. The user may also use his or her own private mobile phone by registering an ID code of the mobile phone in advance. Once the user has come within a certain range from the robot 1, the user can give instructions to the robot 1 via the mobile phone 14 as illustrated in FIG. 4.

Figure 5:
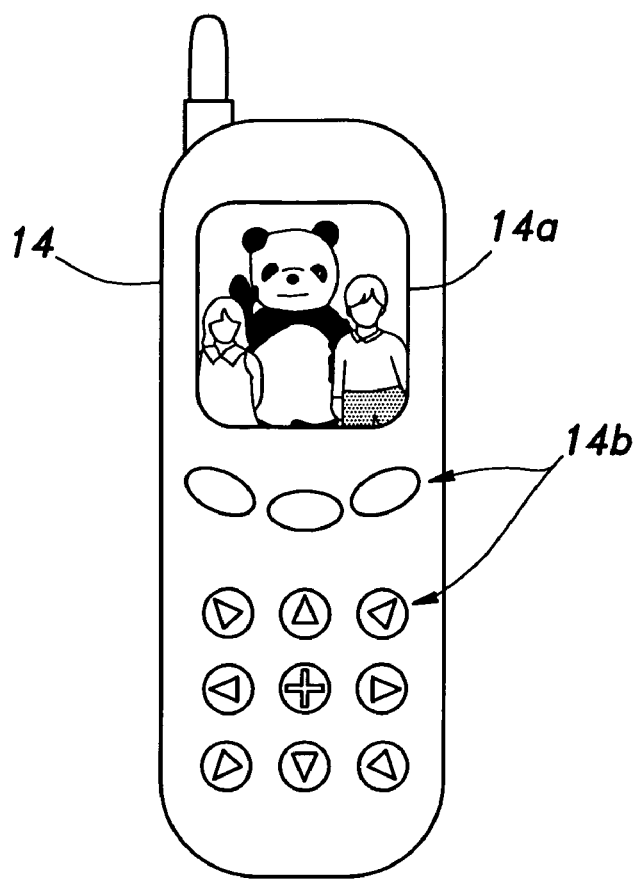
FIG. 5 is a front view of a mobile phone.

FIG. 5 illustrates a mobile phone 14 which comprises a display 14a for displaying the image captured by the robot 1 and text information, and a plurality of command keys 14b. Each key 14b may be assigned with a certain instruction for the robot 1 such as move forward and move rightward, or allow a selection of an item displayed on the display 14a. When the mobile phone 14 consists of a regular mobile phone, each of the ten-keys may be assigned with a specific function.

Figure 6A:
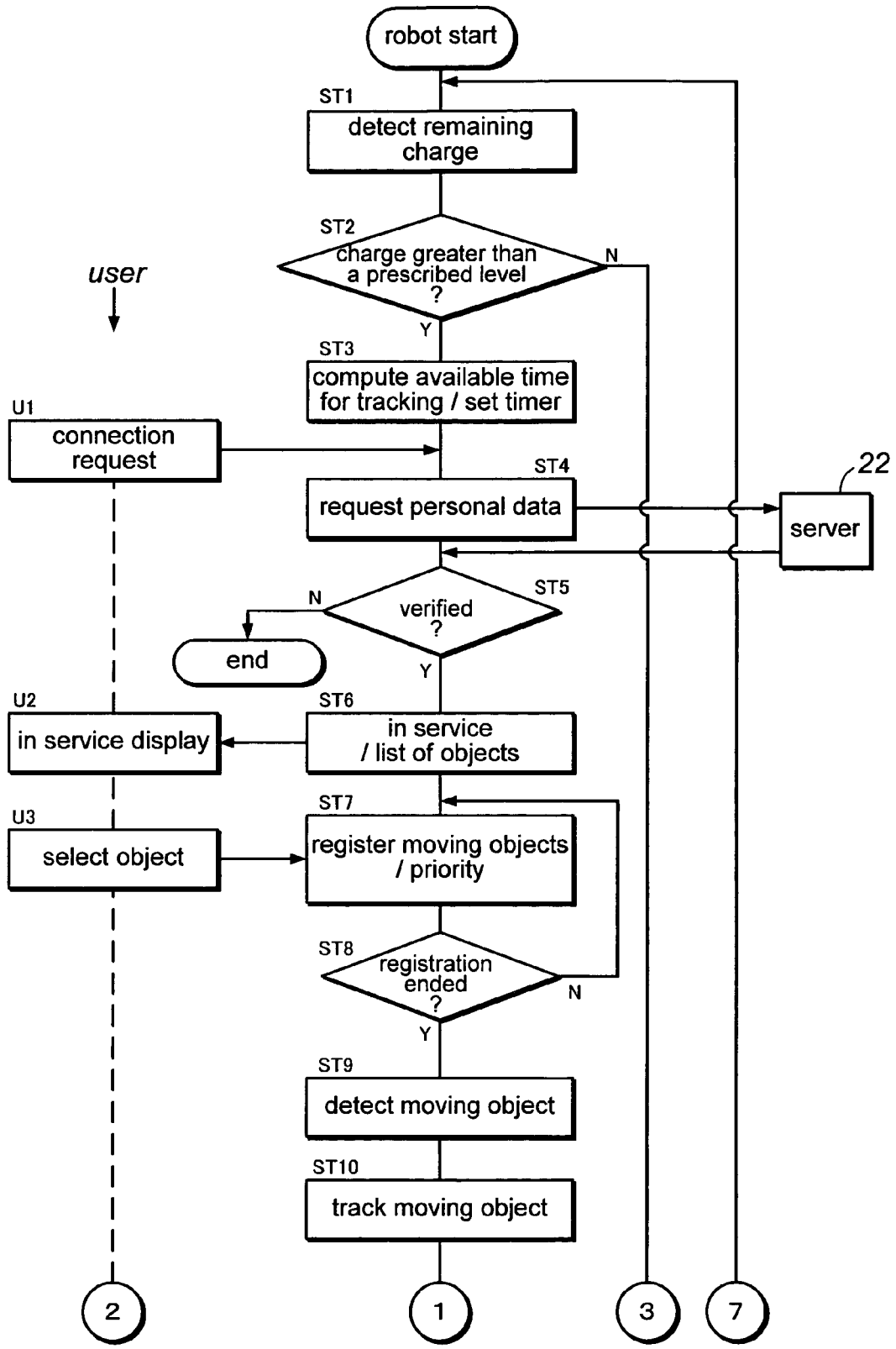
FIGS. 6a to 6c show a flow chart of the control process for the first embodiment of the present invention.
Figure 6B:
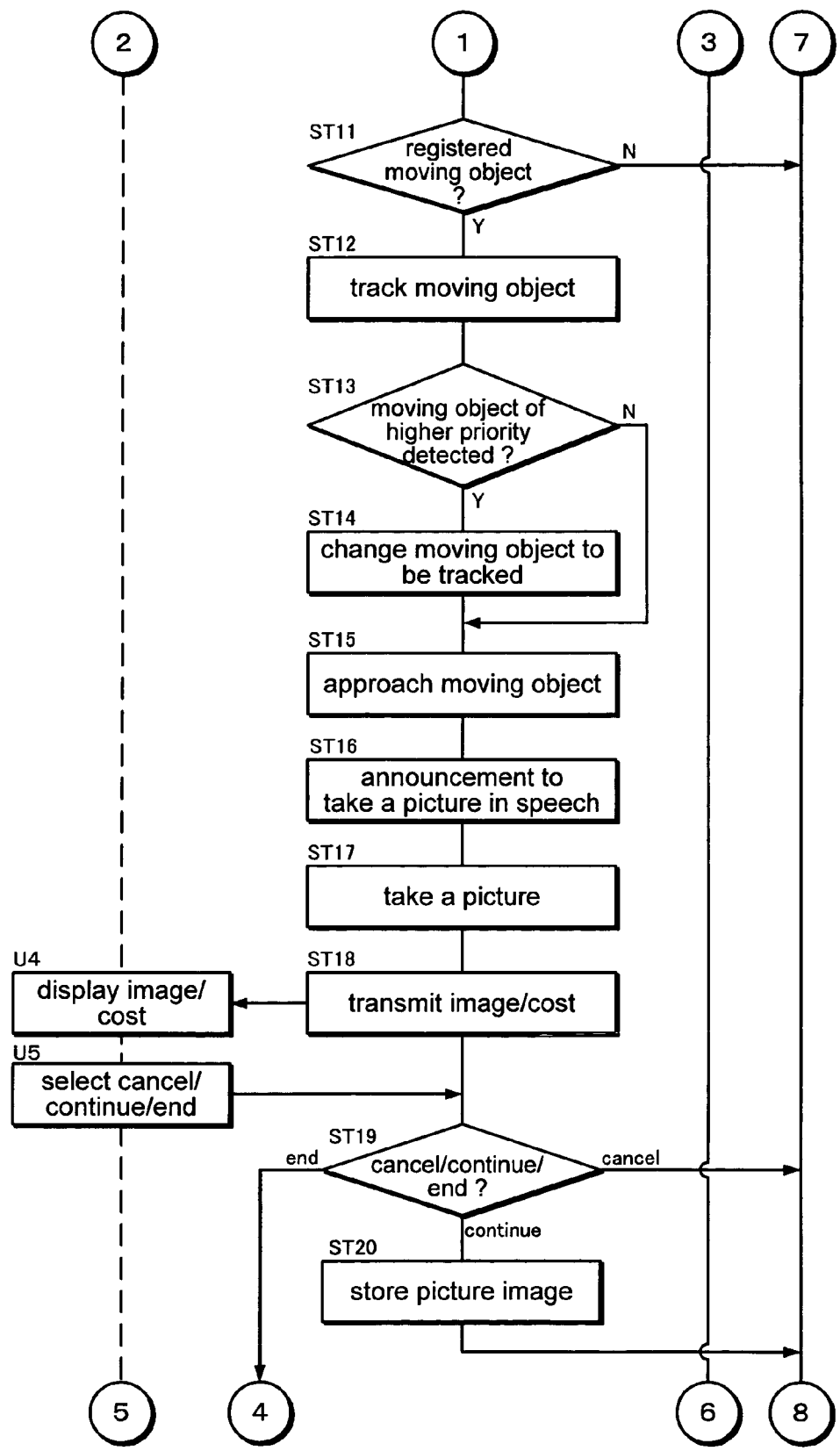
Figure 6C:
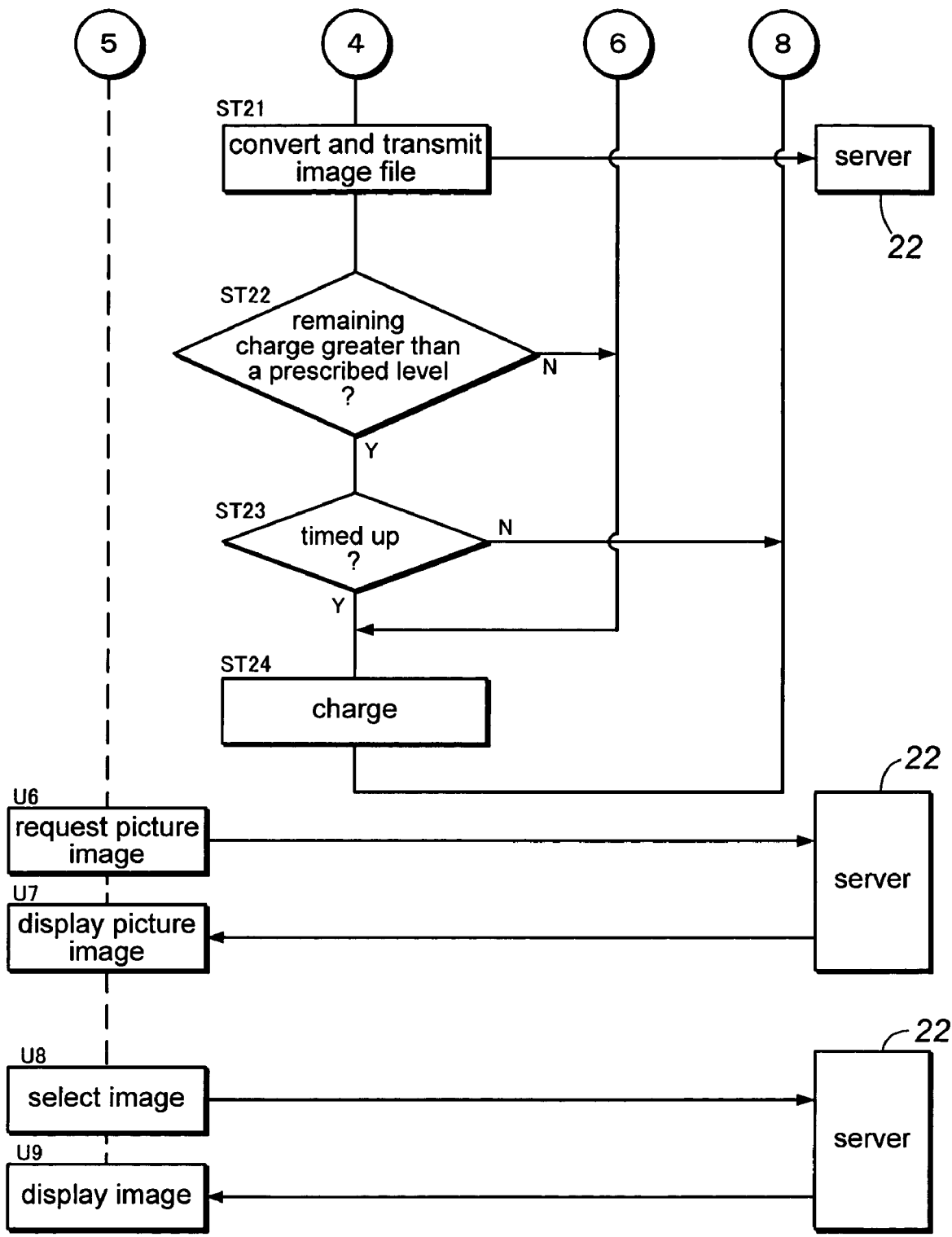
Figure 8:
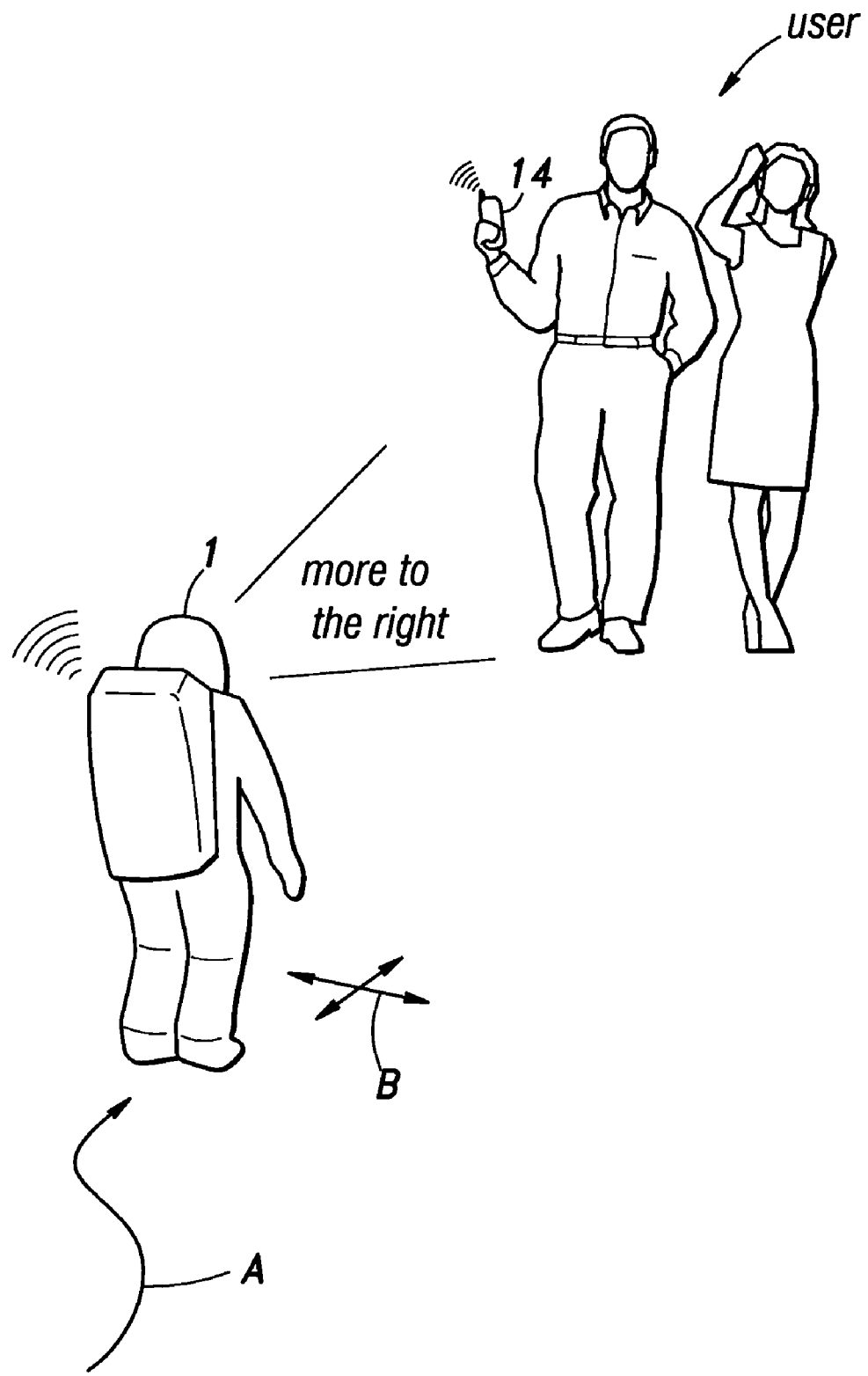
FIG. 8 is a view showing a relationship of users with a robot.
Figure 9A:
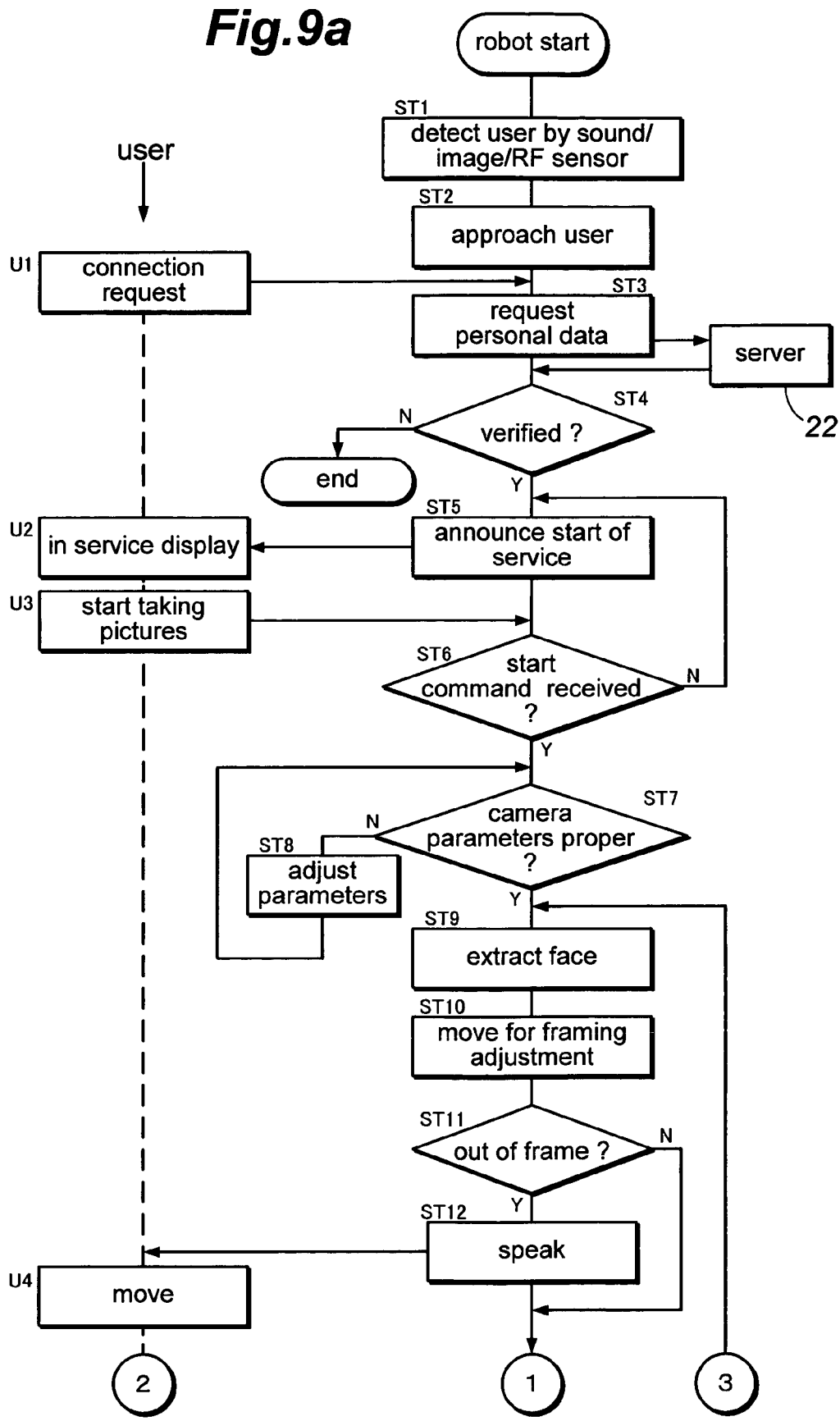

FIGS. 6a to 6c show a flowchart of the control process for the robot 1 when taking a picture of a user. First of all, the remaining charge of the battery 31 is detected in step ST1, and it is determined if the remaining charge is adequate for the robot 1 to track the moving object (the entertainer in a costume) in step ST2. The threshold value of the remaining charge of the battery 31 for this determining process may consist of a fixed value which is computed from the size of the area for the activity of the robot 1 and the position of the charging station 33. Alternatively, the threshold value may be determined as the amount of charge that is required for the robot 1 to travel from the current position to the charging station 33. For this purpose, the robot 1 may be capable of detecting the current position of the robot 1 from the map data in the map database unit 11, and constantly or regularly calculating the distance from the current position to the charging station 33.

When it is determined that the battery has an adequate charge in step ST2, the program flow advances to step ST3. In step ST3, the time duration for which the robot 1 can track the moving object is computed from the remaining charge of the battery, and a timer is set for this time duration. This time duration may be a time duration for which the robot 1 can process the image of the moving object and move about after the moving object without running out of the battery charge.

The user transmits a request for connection (request for a picture taking) to the robot 1 from a mobile phone 14 (U1). The user must be within an area that allows communication with the robot 1. This request may be received by the mobile transceiver 15 of the robot 1 via the mobile base station 23 or by the LAN transceiver 13 of the robot 1 via the LAN transceiver 21 and managing server 22. Upon receipt of this request by the mobile transceiver 15 or LAN transceiver 13, the robot 1 transmits a personal data request signal from the LAN transceiver 13 to verify the personal data contained in the connection request (step ST4). Upon receipt of the personal data request signal from the LAN transceiver 21, the managing server 22 compares the ID code contained in the header of the connection request signal from the mobile phone 14 with the personal data registered in the managing server 22, and returns the result of comparison. The comparison result from the managing server 22 is transmitted from the stationary LAN transceiver 21, and received by the LAN transceiver 13 of the robot 1.

The robot 1 then determines if the ID code of the connection request signal matches with personal data stored in the managing server 22 (step ST5). If there is a match, the program flow advances to step ST6. If there is no match, the current flow is concluded, and the program flow returns to step ST1. The control unit 10 of the robot 1 thus determines if a picture should be taken or not in cooperation with the managing server 22.

In step ST6, the robot 1 transmits a notice of coming into service and a list of the objects for picture taking. The transmission signal can be received by the mobile phone 14 via the mobile base station 23. The notice of coming into service and list of the objects for picture taking are displayed on the display of the mobile phone 14 (U2) to let the user know that the robot 1 is now ready to receive a request for taking a picture. Once the connection request is accepted (U1), the mobile phone 14 is kept in connection with the mobile base station 23. The transmission signal from the mobile phone 14 may contain the verified ID or personal data, for instance in the header so that the operation of the robot 1 may not be disrupted by an access from an unauthorized mobile phone or terminal.

The list of the objects for picture taking may include all or a part of the entertainers in costume, and a number of such lists may be prepared if necessary. It is also possible to define an order of priority among the entertainers.

The robot 1 registers the objects for picture taking or the entertainers in step ST7. If an order of priority is assigned to the entertainers, the robot 1 registers the entertainers according to the order of priority. The kinds of moving objects that are needed to be tracked may be stored in the memory of the robot 1 in advance, and insignias that are to be found on the moving objects and the priority order may also be determined at the same time.

It is determined in step ST8 if the registration of the moving objects has been completed. In case of the priority order, it can be determined by detecting if an accept key has been pressed following the selection of the priority order. Upon completion of the registration, the program flow advances to step ST9. If not, the program flow returns to step ST7 to continue the registration process.

The robot 1 then starts detecting and tracking a registered moving object. The robot 1 first detects a moving object according to the process of recognizing a moving object described above (step ST9). Upon detection of a moving object, the robot 1 tracks the moving object (step ST10). In step ST11, it is determined if the moving object which is being tracked corresponds to any one of the registered moving objects. This can be accomplished, for instance, by extracting a face as described above, and determining if the extracted face matches the face of any of the registered moving objects. If desired, a transponder or transmitter may be attached to the costume so that the costume may be detected by using the RF sensor (individual detection sensor 7) electromagnetically. Alternatively, an insignia may be attached to the costume so that it may be detected optically or visually.

When the detected moving object is identified as being a registered moving object, the program flow advances to step ST12. If not, the program flow returns to step ST1 to start detecting another moving object. The tracking of the moving object is continued in step ST12, and it is determined if a moving object of a higher priority is detected in step ST13. If a higher priority moving object is detected in step ST13, the program flow advances to step ST14 where the tracking of the newly detected moving object is started before the program flow advances to step ST15. If no higher priority registered moving object is not detected in step ST13, the program flow advances to step ST15 to continue to track the currently moving object.

The robot 1 approaches the moving object in step ST15, and speaks to the moving object to inform the moving object of an intention to take a picture in step ST16. A picture of the moving object is taken in step ST 17, and the captured image is transmitted to the managing server 22 in step ST18. At the same time, the outline and face of the moving object are extracted, and the image of the scene surrounding the moving object is captured. In case of an entertainer wearing a costume, the image of the entertainer and people (children) surrounding the entertainer is captured.

In this manner, when there in only one registered moving object, the robot 1 tracks only this moving object. If there are a plurality of registered moving objects, the robot 1 tracks the currently detected moving object until a higher priority registered moving object is detected. The robot 1 changes the moving object that it is tracking as soon as a higher priority registered moving object is detected. Therefore, the robot 1 tracks a moving object having a highest priority among those detected, and this maximizes the satisfaction of the user.

The charge data based on a predetermined price list as well as the captured image is transmitted in step ST18. The means for executing this charging process is implemented as a program stored in the control unit 10. The captured image and applicable charge are displayed on the display 14*a* of the mobile phone 14 held by the user (U4). The user selects a command from "cancel", "continue" and "end" shown on the monitor, and gives the corresponding command to the robot 1 (U5). Alternatively, the user may say "cancel", "continue" or "end" on the mobile phone 14 to give the corresponding command to the robot 1 in speech.

The robot 1 determines which of the commands "cancel", "continue" and "end" is selected in step ST19. If "continue" is selected, the program flow advances to step ST20 where the selected image is stored and the program flow returns to step ST1 to be ready for a new picture taking process. In this case, the process of charging the cost to the user is completed. When "cancel" is selected, the program flow returns to step ST1. In this case, no image is stored, and no charge is applied.

When "end" is selected, the program flow advances to step ST21 where the selected image is converted into an image file which is convenient for the user to handle by the image processing unit 3 and control unit 10. The processed image is transmitted to the managing server 22, and the picture taking mode is concluded. The determination of the selected image is executed by a program stored in the control unit 10.

Once a picture or pictures of the moving object are taken, it is determined once again in step ST22 if the remaining battery charge is greater than a certain prescribed level. When the remaining battery charge is greater than the prescribed level, the program flow advances to step ST23 where it is determined if the timer which was set in step ST3 has timed up. If the timer has not still timed up, the program flow returns to step ST1 to prepare for the picture taking process for a next moving object.

When the remaining battery charge is not greater than the prescribed level in step ST22 or when the timer has timed up in step ST23, as it means that there is not adequate remaining battery charge for the robot 1 to track a next moving object, the robot 1 proceeds to the charging stand 33 to be electrically charged (step ST24). The robot 1 is capable of traveling to the charging stand 33 and connecting a charging cable to a connector provided on the robot 1 all by itself in a fully automated fashion. Upon completion of the electric charging, the program flow returns to step ST1 to wait for a new request for a picture taking.

Each user can access the server 22 from the mobile phone 14 to transmit a request for the acquired picture image (U6). In response to such a request, the server 22 transmits a list of picture images acquired by the robot 1, and displays a list of picture images on the mobile phone 14 (U7). When there are a plurality of picture images, the picture images may be shown on the display 14*a* one after another in a consecutive manner or, alternatively, simultaneously as thumbnail images.

The user then selects a desired picture image, and the selection is transmitted to the server (U8). The server 22 then transmits the desired picture image, and shows it on the mobile phone 14 (U9). It is also possible to have the selected picture image printed out at a prescribed location for the user to come to this location to pick up the printed copy of the picture image. The foregoing process (U6 to U9) is made possible only when the cost has been properly charged to the user. The user can obtain the picture image in electronic form or as a printed copy not only at the event site but also later from home or a different location.

The selected picture image may be stored in the managing server 22 in association with the corresponding personal data or may be transferred from the managing server 22 to the database unit 25*a* of the data server 25 via the Internet. Thereby, the user can download the desired picture image from the managing server 22 or data server 23 from the user's personal computer at home via the Internet and, if desired, have it printed by a personal printer. If the user's mail address is registered in the managing server 22 as part of the personal data, it is also possible to transmit the selected picture image to such a mail address. Because the picture images acquired by the robot 1 are successively transmitted to the managing server 22 and are not required to be stored in the robot 1, the robot 1 is capable of taking pictures without the risk of running out of memory space.

As can be appreciated from the foregoing description, this embodiment allows each user or visitor to an event site to send a request to take a picture of a moving object from a portable terminal such as a mobile phone and to have a robot detect and track the moving object and take a picture thereof. Such an arrangement would be useful in applications where a traveling robot is used for taking pictures of moving objects according to commands from remote or portable terminals. The user may have the robot take his or her own pictures or pictures of other group members or family members like children of the user.

FIGS. 7 to 10 show a second embodiment of the present invention which is similar to the first embodiment, and the parts of the second embodiment corresponding to those of the first embodiment are denoted with like numerals without repeating the description of such parts.

The second embodiment is additionally provided with the function of detecting a skin color. A skin color region may be extracted in an HLS (hue-lightness-saturation) space, and determination of a color as being a skin color or not may be executed as a comparison of the detected color with threshold values. If a skin color is detected in a face region, the detected face region may be verified as being indeed a face. For instance, the center of a face can be determined as a gravitational center of a region having a skin color. The face region can be determined as an elliptic region 19 defined around the gravitational center and having an area corresponding to a typical size of a face.

Figure 7:
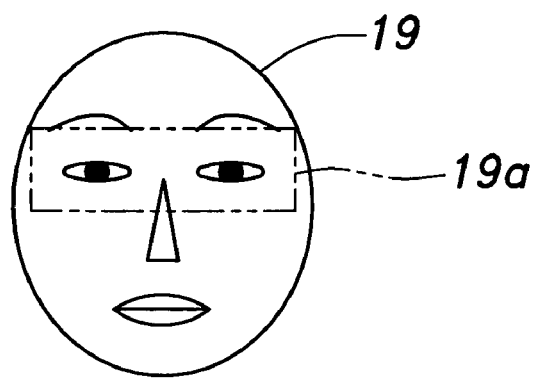
FIG. 7 is a schematic view how eyes and a face can be extracted from the obtained picture image.

Referring to FIG. 7, eyes can be extracted from the elliptic region 19 by detecting black circles (pupils of the eyes) by using a circular edge extracting filter. This can be accomplished in a following manner. A pupil search area 19*a* having a prescribed height and width is defined within the elliptic region 19 according to the typical distance between the top of the head and eyes of a typical human. The height and width of the pupil search area 19*a* varies depending on the distance to the object. The detection of black circles or pupils can be conducted in a relatively short period of time because the search area can be limited to the pupil search area 19a. The face image can be cut out thereafter. The size of the face can be readily determined from the space between the two eyes that are detected.

FIGS. 8a and 8b show a flowchart of the control process for the robot 1 when taking a picture of a user while taking instructions from the user. First of all, a user is detected by the robot 1 from the processing of sound/images that are captured by the robot 1 or a detection signal of the individual detection sensor 7 received from a transmitter which each user is given following the initial registration process (step ST1). When a user is detected, the robot 1 approaches the user (step ST2). The robot 1 changes direction as it moves toward the user so as to keep the image of the user within the viewing angle of the robot 1. How close the robot 1 should come to the user may be determined in advance, and the robot 1 may be program to stand still as soon as it has come to a prescribed short distance to the user.

The user is able to see that the robot 1 is coming toward him or her, and may transmit a connection request (request for a picture taking) to the robot 1 from a mobile phone 14 carried by the user at an appropriate timing (U1). This request may be received by the mobile transceiver 15 of the robot 1 via the mobile base station 23 or by the LAN transceiver 13 of the robot 1 via the LAN transceiver 21 and managing server 22. Upon receipt of this request by the mobile transceiver 15 or LAN transceiver 13, the robot 1 transmits a personal data request signal from the LAN transceiver 13 to the server 22 to verify the personal data contained in the connection request (step ST3). Upon receipt of the personal data request signal from the LAN transceiver 21, the managing server 22 compares the ID code contained in the header of the connection request signal from the mobile phone 14 with the personal data registered in the managing server 22, and returns the result of comparison. The comparison result from the managing server 22 is transmitted from the LAN transceiver 21, and received by the LAN transceiver 13 of the robot 1.

The robot 1 then determines if the ID code of the connection request signal matches with personal data stored in the managing server 22 (step ST4). If there is a match, the program flow advances to step ST5. If there is no match, the current flow is concluded, and the program flow returns to step ST1. The control unit 10 of the robot 1 thus determines if a picture should be taken or not in cooperation with the managing server 22.

In step ST5, the robot 1 transmits a notice of coming into service. The transmission signal can be received by the mobile phone 14 via the mobile base station 23. The notice of coming into service is displayed on the display of the mobile phone 14 (U2) to let the user know that the robot 1 is now ready to receive a request to take a picture. Once the connection request is accepted (U1), the mobile phone 14 is kept in connection with the mobile base station 23. The transmission signal from the mobile phone 14 may contain the verified ID or personal data, for instance in the header so that the operation of the robot 1 may not be disrupted by an access from an unauthorized mobile phone or terminal.

When the user has judged that he or she is in a position for the robot 1 to be able to take a picture, the user presses a prescribed key on the mobile phone 14 to instruct the robot 1 to start taking a picture (U3). If desired, the robot 1 may be adapted to be able to receive commands by speech. In such a case, the sound processing unit 6 is required to be able to recognize speech and look up a list of vocabulary. By limiting the kinds of commands, the robot 1 can readily determine which of the commands it has received.

The robot 1 determines if a command to take a picture has been received in step ST6. If such a command has been received, the program flow advances to step ST7. Otherwise, the program flow returns to step ST5 and wait for a command. Although not shown in the drawings, the robot 1 may be incorporated with a timer which is set when a command to take a picture has been received so that the program flow may return to step ST1 when this timer has timed up although it is not shown in the drawings. Such a fail-safe feature may be provided in appropriate places in the control flow.

It is determined in step ST7 if the various parameters associated with the camera 2 are appropriate. Such parameters should be selected so as to enable a clear picture to be taken under the existing condition, and can be determined from the CCD output of the camera. When any of the parameters is determined to be improper, the program flow advances to step ST8 where the inappropriate parameter is adjusted before the program flow returns to step ST7. If all the parameters are appropriate, the program flow advances to step ST9.

A face is extracted in step ST9 as described earlier, and a framing adjustment is made in step ST10. A framing adjustment can be made by adjusting the position of the robot 1. Alternatively, the robot 1 may turn its head. This needs to be only a rough adjustment so as to put the object substantially in the center of the frame in a short period of time without keeping the user waiting for any prolonged period of time.

It is determined in step ST11 if the object has been put inside the frame as a result of the framing adjustment. If the framing adjustment conducted in step ST10 has failed to put the object inside the frame, the program flow advances to step ST12 where the robot 1 speaks to the user to move to the right or otherwise position the user inside the frame. This message in speech is synthesized by the sound processing unit 6 and is produced from the loudspeaker 5.

The user moves as urged by the robot 1 (U4). Following step ST12 or if the object is determined to be inside the frame in step ST11, the program flow advances to step ST13 where a picture is taken by using the camera 2 by using the adjusted parameters. Once a picture is taken, the captured image data is transmitted from the mobile transceiver 15 in step ST14.

When the picture image data is transmitted, the corresponding picture image is shown on the display of the mobile phone 14 (U5). The user then decides if the displayed picture image is acceptable or not, and commands the robot 1 to cancel or accept the picture taking process. The cancel/end command key may be assigned to any one of the keys 14b, but the display may also be adapted in such a manner that the user may highlight a corresponding item on the display by using an arrow key and accept the highlighted item. The robot 1 may also be adapted to recognize such speech commands as "cancel" and "end" (U6). The robot 1 detects a cancel/end command in step ST15. If a cancel command is detected, the program flow advances to step ST9 to start a new picture taking process.

Figure 10:
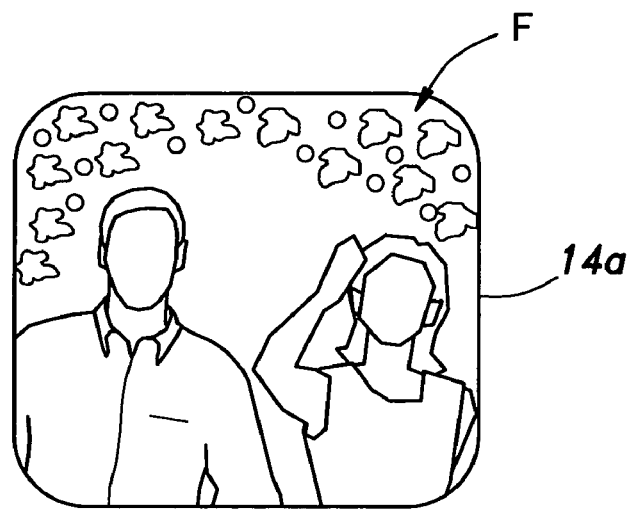
FIG. 10 is a view of a display showing an acquired picture image combined with a background frame.
Figure 15:
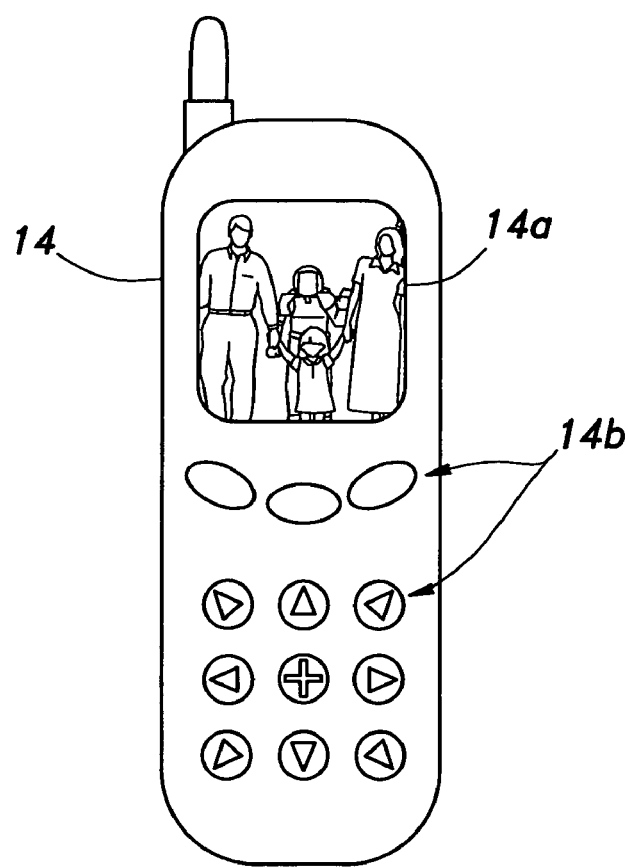
FIG. 15 is a front view of a mobile phone.

When an end command is detected in step ST15, the program flow advances to step ST16, and have the robot 1 transmit a background frame on which the acquired image is to be superimposed. This can be accomplished by transmitting background frame data stored in a memory device not shown in the drawing via the mobile transceiver 15 under control from the control unit 10. The control unit 10 and mobile transceiver 15 jointly form a background frame transmitting means. FIG. 10 shows an example of such a background frame F. A plurality of background frames may be prepared in advance so that the robot 1 may offer a number of such background frames one by one on the display 14a for the user to select a desired one from them. The user selects a background frame (including the choice of having no background frame), and commands the robot 1 accordingly (U7).

The robot 1 determines if there is any background frame selection command in step ST17. This process may be executed upon elapsing of a certain time period from the time the transmission of the background frames started in step ST16. When a background frame selection command is detected in step ST17, the program flow advances to step ST18 where the acquired picture image is combined with the selected background frame. More sophisticated mode of superimposition may be performed. Because the size of the person can be determined by extracting the face of the person, it is possible to cut out the person, and superimpose the image of the person on the background frame at a desired position. Such a process of combining the image of the person with the background frame is performed by image combining means jointly formed by the image processing unit 3 and control unit 10.

The program flow then advances to step ST19. If not to have any background frame is selected in step ST17, the program flow also advances to step ST 19. In step ST19, the control unit 10 transmits a cost charging data based on a predetermined pricing schedule along with the combined image or image having no background frame obtained in step ST18. Such a cost charging process is executed by a program incorporated in the control unit 10.

The selected image and corresponding cost are shown on the display 14a of the mobile phone 14 (U8). The user finally selects a cancel, continue or end to command the robot 1 accordingly (U9). The robot 1 may be adapted to follow speech commands such as "cancel", "continue" and "end" spoken by the user.

The robot 1 determines if any one of the cancel, continue or end commands is made in step ST20. When the continue command is selected, the program flow advances to step ST21 where the selected image is stored and the program flow returns to step ST9 to start a new picture taking process. At this time point, the cost charging to the user is made. If the cancel command is selected, the program flow returns to step ST9 to start a new picture taking process. In this case, the captured image is not stored, and no cost charging is made.

When the end command is selected, the program flow advances to step ST22 where the image processing unit 3 and control unit 10 jointly convert the selected image or images into a file format which is convenient for the user to handle and the converted image data is transmitted to the managing server 22 before the picture taking process is concluded. The process for finally accepting the selected picture image is executed by a selected image determining means implemented as a program incorporated in the control unit 10.

When there are a plurality of selected picture images, the picture images may be shown on the display 14a one after another in a consecutive manner or, alternatively, simultaneously as thumbnail images. Thereby, the user can select the desired picture images one by one while confirming that the selection is correct. If desired, it is also possible to have the selected picture images printed out at a prescribed location for the user to come to this location to pick up the printed copies of the picture images.

The selected picture image may be stored in the managing server 22 in association with the corresponding personal data or may be transferred from the managing server 22 to the database unit 25a of the data server 25 via the Internet. Thereby, the user can download the desired picture images from the managing server 22 or data server 23 from the user's personal computer at home via the Internet and, if desired, have it printed by a personal printer. If the user's mail address is registered in the managing server 22 as part of the personal data, it is also possible to transmit the selected picture image to such a mail address. Because the picture images acquired by the robot 1 are successively transmitted to the managing server 22 and are not required to be stored in the robot 1, the robot 1 is capable of taking pictures without the risk of running out of memory space.

According to the second embodiment described above, a user can command a robot to take a picture of the user or somebody else in an appropriate manner from a mobile terminal such as a mobile phone, and the robot can offer the choice of a background frame on which the captured image may be superimposed. This allows the robot to take a picture of an object in a rapid and desired manner.

Figure 12A:
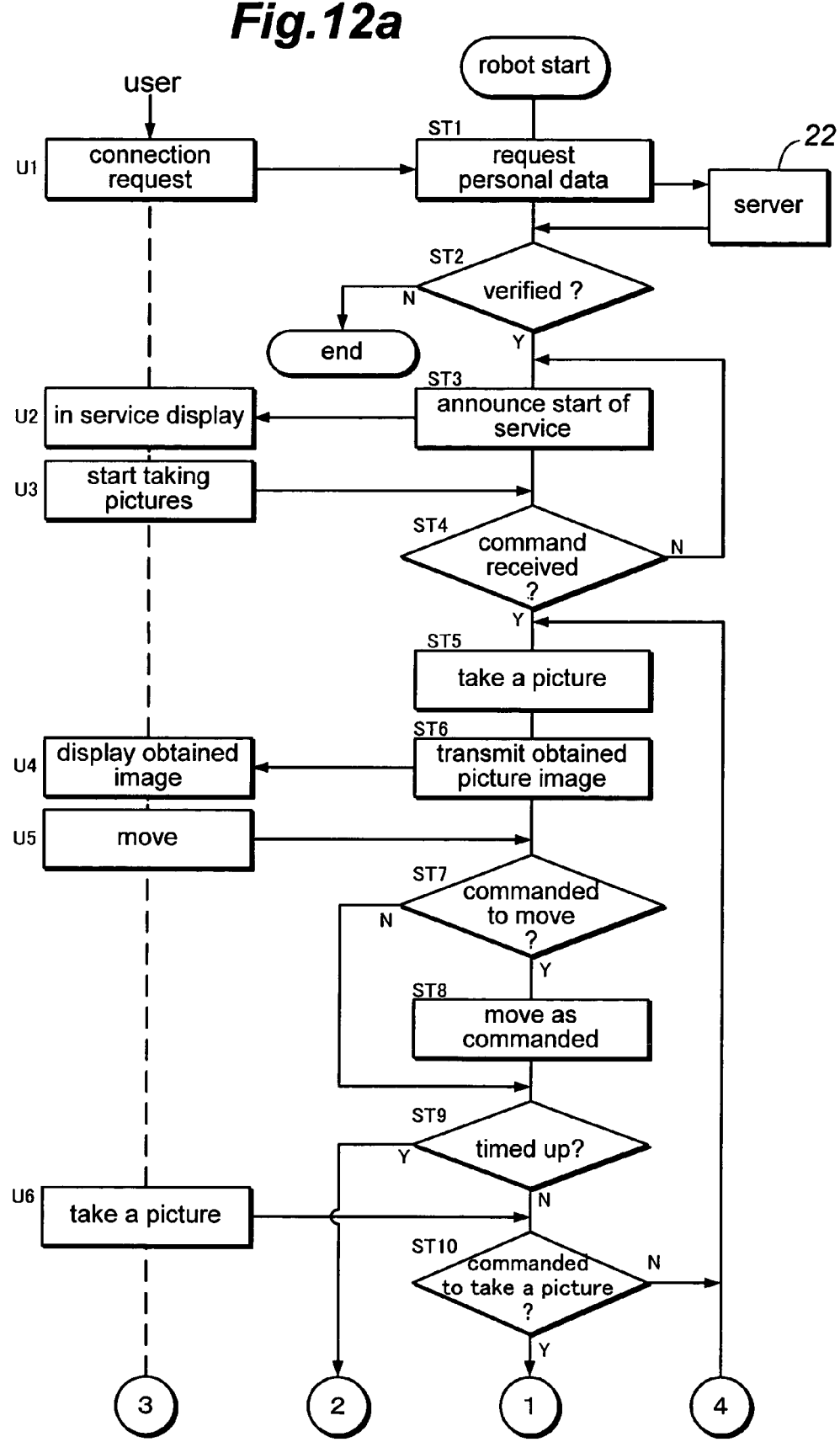
FIGS. 12a and 12b show a flow chart of the control process for the third embodiment of the present invention.
Figure 12B:
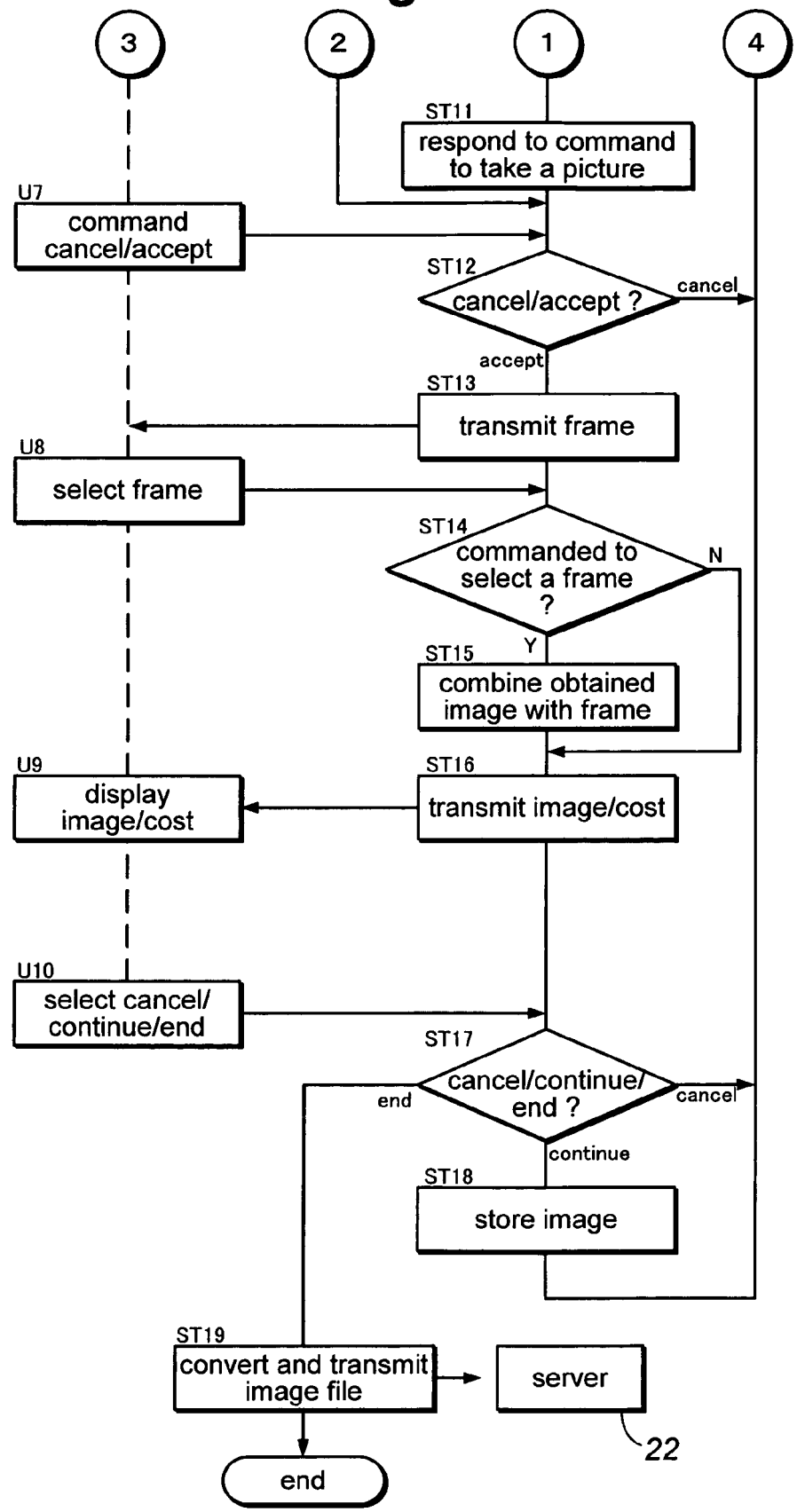
Figure 13:
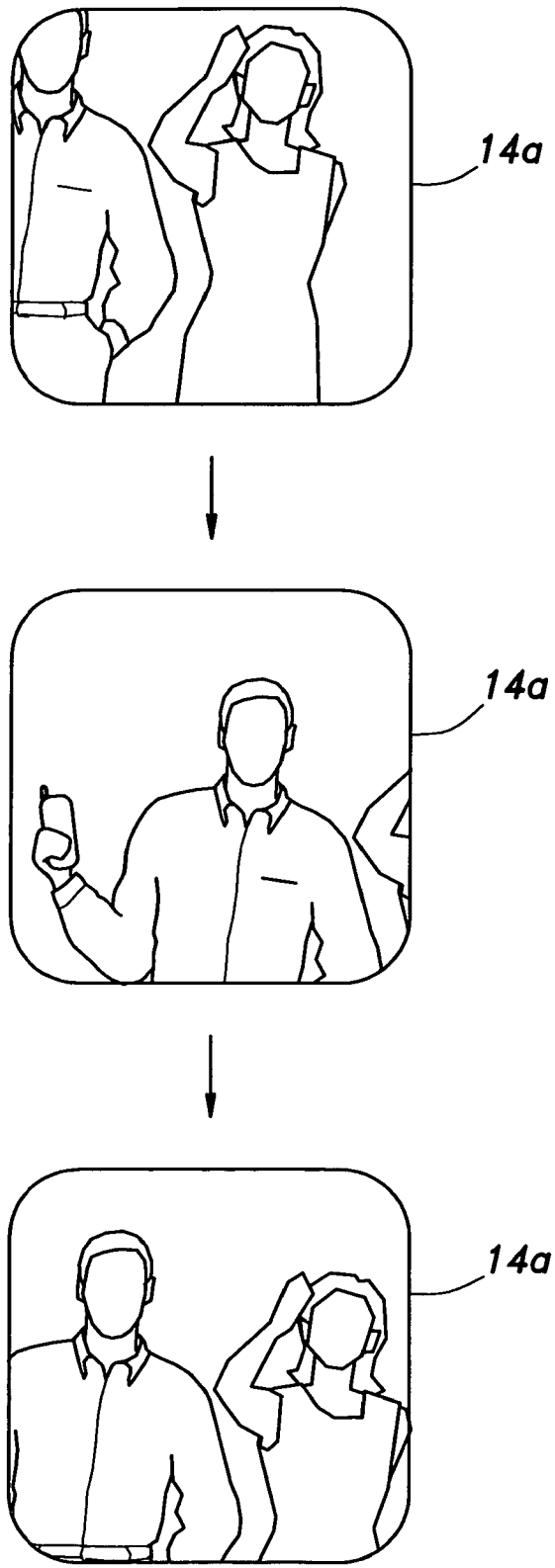
FIG. 13 shows how the frame layout is modified as a result of interaction between the user and robot.

FIGS. 11 to 13 show a third embodiment of the present invention which is similar to the previous embodiments, and the parts of the third embodiment corresponding to those of the previous embodiments are denoted with like numerals without repeating the description of such parts.

In this embodiment, the sound processing unit 6 receives the sound signals from the two microphones 4, and determines the location of the sound source from the differences in the sound pressures and arrival times. Additionally, the sound processing unit 6 identifies the kind of sound such as cheers and handclapping from the rise properties and spectral properties of the sound, and recognizes speech according to a vocabulary which is registered in advance. If required, the robot may move toward the source of the sound, and take pictures of the surrounding area.

The robot is capable of looking up the map database stored in the map database unit 11 so that the current position may be identified, and the robot 1 may stay within a predetermined boundary for the activity of the robot. Therefore, the robot 1 would not stray into unknown areas where the robot may stumble upon any unexpected objects or obstacles, or areas where LAN or mobile phone communication is not possible.

FIGS. 12a and 12b show the process of commanding the robot to take a picture and how the robot takes a picture according to such a command. First of all, the user transmits a request for connection to the robot 1 from a remote terminal of the user which typically consists of a mobile phone 14 (U1). The user must be within an area that allows communication with the robot 1. This request may be received by the mobile transceiver 15 of the robot 1 via the mobile base station 23 or by the LAN transceiver 13 of the robot 1 via the LAN transceiver 21 and managing server 22. Upon receipt of this request by the mobile transceiver 15 or LAN transceiver 13, the robot 1 transmits a personal data request signal from the LAN transceiver 13 to the server 22 to verify the personal data contained in the connection request (step ST1). Upon receipt of the personal data request signal from the LAN transceiver 21, the managing server 22 compares the ID code contained in the header of the connection request signal from the mobile phone 14 with the personal data registered in the managing server 22, and returns the result of comparison. The comparison result from the managing server 22 is transmitted from the LAN transceiver 21, and received by the LAN transceiver 13 of the robot 1.

The robot 1 then determines if the ID code of the connection request signal matches with personal data stored in the managing server 22 (step ST2). If there is a match, the program flow advances to step ST3. If there is no match, the current flow is concluded, and the program flow returns to step ST1 and wait for a new request for connection. The control unit 10 of the robot 1 thus determines if a picture should be taken or not in cooperation with the managing server 22.

In step ST3, the robot 1 transmits a notice of coming into service. The transmission signal can be received by the mobile phone 14 via the mobile base station 23. The notice of coming into service is displayed on the display of the mobile phone 14 (U2) to let the user know that the robot 1 is now ready to receive a request for taking a picture. Once the connection request is accepted (U1), the mobile phone 14 is kept in connection with the mobile base station 23. The transmission signal from the mobile phone 14 may contain the verified ID or personal data, for instance in the header so that the operation of the robot 1 may not be disrupted by an access from an unauthorized mobile phone or terminal.

When the user has judged that he or she is in a position for the robot 1 to be able to take a picture, the user presses a prescribed key on the mobile phone 14 to instruct the robot 1 to start taking a picture (U3). If desired, the robot 1 may be adapted to be able to receiving commands by speech. In such a case, the sound processing unit 6 is required to be able to recognize speech and look up a list of vocabulary. By limiting the kinds of commands, the robot 1 can readily determine which of the commands it has received.

The robot 1 determines if a command to take a picture has been received in step ST4. If such a command has been received, the program flow advances to step ST5. Otherwise, the program flow returns to step ST3 and wait for a command. The robot 1 may be incorporated with a timer which is set when a command to take a picture has been received so that the program flow may return to step ST1 when this timer has timed up although it is not shown in the drawings. Such a fail-safe feature may be provided in appropriate places in the control flow.

The robot 1 actually takes a picture in step ST5 according to a prescribed procedure. This procedure includes the extraction of a human which was described earlier. The camera 2 may be provided with an auto focusing mechanism. When a picture has been taken, the picture image is transmitted from the mobile transceiver 15 in step ST6.

When the picture image is transmitted, it is displayed on the mobile phone 14 (U4). For instance, when the robot 1 is at the position P1 and takes a picture of a user as shown in FIG. 11, the picture of the user taken by the robot 1 may appear too small in the image, and part of the user may fail to be covered as illustrated in the uppermost picture in FIG. 13. In such a case, the user may command the robot 1 to change its position and take a new picture after changing position (U5). This command can be made by assigning the movement in each direction to a corresponding key of the mobile phone and pressing a corresponding one of the keys to move the robot 1 to a desired spot. This command may also be made by speech if the controller of the robot is appropriately adapted.

It is detected in step ST7 if a command for movement in any direction has been received or not following a prescribed waiting time period. If there was any such command during the waiting time period, the program flow advances to step ST8. Otherwise, the program flow advances to step ST9 without moving.

For instance, when the user has commanded the robot to move forward from the position P1 to the position P2 shown in FIG. 11, the robot 1 determines the reception of such a command by the control unit 10, and actuates its legs via the drive unit 10 to move forward in step ST8. It is determined in step ST9 if the prescribed time period has elapsed since the start of the picture taking process in step ST5 by checking if the timer has timed up. If not, the program flow advances to step ST1.

It is determined in step ST10 if there is a command to take a picture. When there is such a command from the user, the robot 1 takes a picture according to the command. The command is made by pressing a key assigned for such a command, and pressing this key causes a picture taking command signal to be transmitted from the mobile phone 14 (U6). It is also possible to adapt the control unit 10 so as to take a command by speech transmitted by the mobile phone 14.

If it is determined in step ST10 that there is not a command to take a picture, the program returns to step ST5 and a new picture taking process begins. It should be noted that the robot 1 constantly or regularly takes pictures and transmit the acquired picture images (in step ST6) and the user is able to see them on the mobile phone 14 (U4), but they are taken only for provisional purposes and are to be discarded except those which are finally forwarded to the server or selected when the final selection is made afterwards. In other words, the robot consecutively takes pictures and transmits the acquired images to the user until the command to take a picture is received from the user. Therefore, the user can check the layout of the captured picture images while changing the positions of the robot and user until a desired layout is achieved.

For instance, suppose that the robot 1 has moved forward from the position P1, and has taken a picture at the position P2. The taken picture may be as shown in the middle of FIG. 13, and one of the persons in the picture is partly out of the frame. Therefore, the user may command the robot to move a forward and rightward direction. As a result, the robot reaches the position P3 and the obtained picture may look as shown in the bottom of FIG. 13. The user finally finds this picture acceptable. Thus, the user is able to obtain a desired picture by commanding the robot to move to a new position and/or face a new direction so as to achieve a desired frame layout of the persons and/or objects in the picture.

The robot 1 may be adapted to react to the user in an appropriate manner in step ST11 so as to improve the layout of the picture that is going to be taken. For instance, the robot 1 may say to the persons whose picture is about to be taken such words as "Say cheese!" to put them ready for a picture taking. This speech is synthesized in the sound processing unit 6, and is produced from the loudspeaker 5. Thereby, the user is properly warned of being photographed, and a satisfactory picture can be taken every time.

The user decides if the picture image transmitted from the robot 1 is acceptable or not, and may give a cancel command or an accept command to the robot 1. The cancel/accept command may be assigned to any one of the keys on the mobile phone, but the display 14*a* of the mobile phone may also be adapted in such a manner that the user may highlight a corresponding item on the display by using an arrow key and accept the highlighted item. Alternatively, a speech command may also be used if desired (U7).

The robot 1 detects a cancel/accept command in step ST12. When a cancel command is detected, the program flow returns to step ST5, and starts a new picture taking process. When the time has timed up in step ST9, the program also advances to step ST12 to wait for a cancel/end command from the user.

When an accept command is detected in step ST12, the program flow advances to step ST13, and have the robot 1 transmit a background frame on which the acquired image is to be superimposed. This can be accomplished by transmitting background frame data stored in a memory device not shown in the drawing via the mobile transceiver 15 under control from the control unit 10. The control unit 10 and mobile transceiver 15 jointly form a background frame transmitting means. FIG. 10 for the previous embodiment shows an example of such a background frame F. A plurality of background frames may be prepared in advance so that the robot 1 may offer a number of such background frames one by one on the display 14*a* for the user to select a desired one from them. The user selects a background frame (including the choice of having no background frame), and commands the robot 1 accordingly.

The robot 1 determines if there is any background frame selection command in step ST14. This process may be executed upon elapsing of a certain time period from the time the transmission of the background frames started in step ST13. When a background frame selection command is detected in step ST14, the program flow advances to step ST15 where the acquired picture image is combined with the selected background frame. More sophisticated mode of superimposition may be performed. Because the size of the person can be determined by extracting the face of the person, it is possible to cut out the person, and superimpose the image of the person on the background frame at a desired position. Such a process of combining the image of the person with the background frame is performed by image combining means jointly formed by the image processing unit 3 and control unit 10.

The program flow then advances to step ST16. If not to have any background frame is selected in step ST14, the program flow also advances to step ST 16. In step ST16, the control unit 10 transmits a cost charging data based on a predetermined pricing schedule along with the combined image or image having no background frame obtained in step ST15. Such a cost charging process is executed by a program incorporated in the control unit 10.

The selected image and corresponding cost are shown on the display 14*a* of the mobile phone 14 (U9). The user finally selects a cancel, continue or end to command the robot 1 accordingly (U10). The robot 1 may be adapted to follow speech commands such as "cancel", "continue" and "end" spoken by the user.

The robot 1 determines if any one of the cancel, continue or end commands is made in step ST17. When the continue command is selected, the program flow advances to step ST18 where the selected image is stored and the program flow returns to step ST5 to start a new picture taking process. At this time point, the cost charging to the user is made. If the cancel command is selected, the program flow returns to step ST5 to start a new picture taking process. In this case, the captured image is not stored, and no cost charging is made.

When the end command is selected, the program flow advances to step ST19 where the image processing unit 3 and control unit 10 jointly convert the selected image or images into a file format which is convenient for the user to handle and the converted image data is transmitted to the managing server 22 before the picture taking process is concluded. The process for finally accepting the selected picture image is executed by a selected image determining means implemented as a program incorporated in the control unit 10.

When there are a plurality of selected picture images, the picture images may be shown on the display 14*a* one after another in a consecutive manner or, alternatively, simultaneously as thumbnail images. Thereby, the user can select the desired picture images one by one while confirming that the selection is correct. If desired, it is also possible to have the selected picture images printed out at a prescribed location for the user to come to this location to pick up the printed copies of the picture images.

The selected picture image may be stored in the managing server 22 in association with the corresponding personal data or may be transferred from the managing server 22 to the database unit 25*a* of the data server 25 via the Internet. Thereby, the user can download the desired picture images from the managing server 22 or data server 23 from the user's personal computer at home via the Internet and, if desired, have it printed by a personal printer. If the user's mail address is registered in the managing server 22 as part of the personal data, it is also possible to transmit the selected picture image to such a mail address. Because the picture images acquired by the robot 1 are successively transmitted to the managing server 22 and are not required to be stored in the robot 1, the robot 1 is capable of taking pictures without the risk of running out of memory space.

Figure 14:
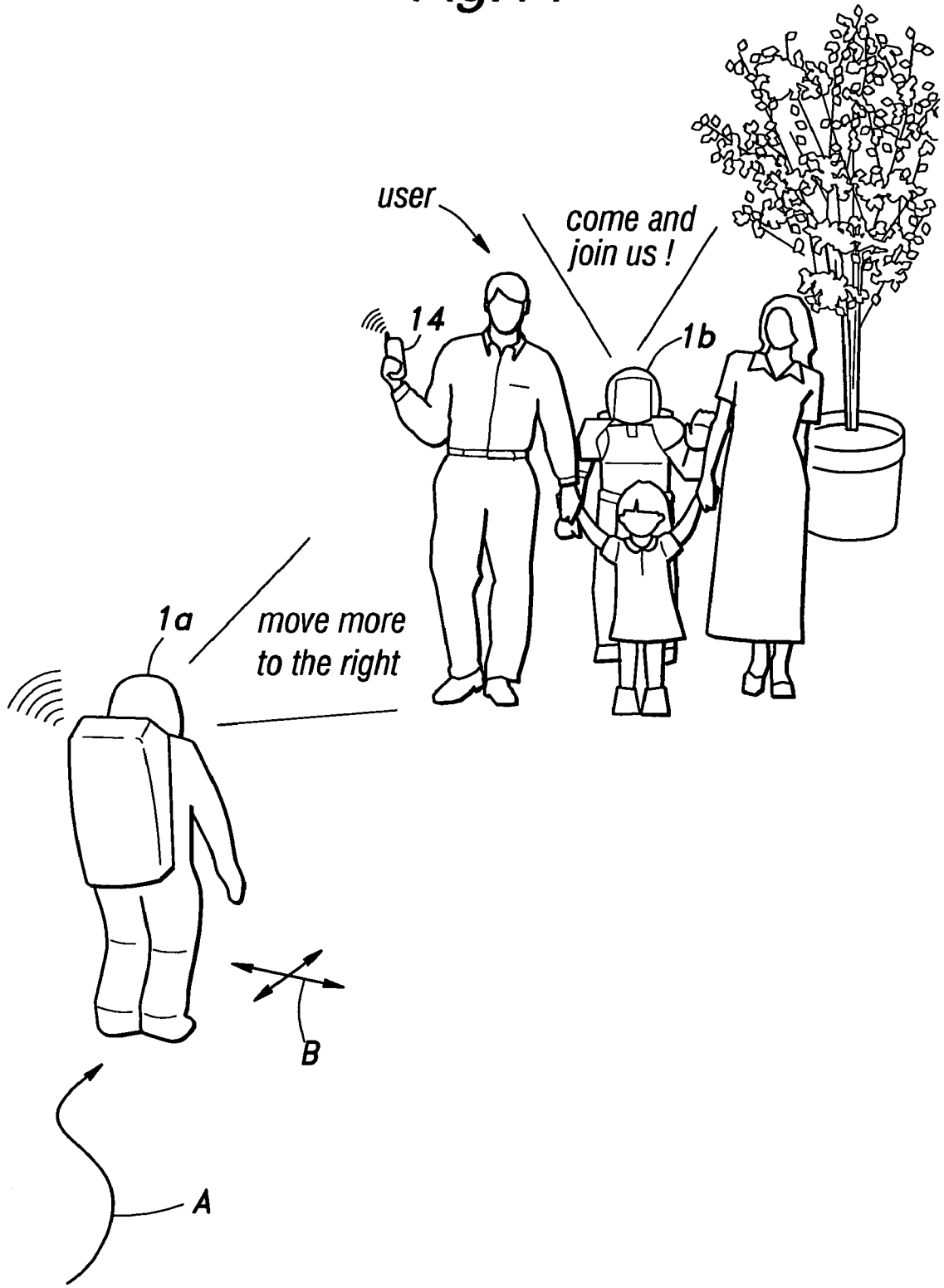
FIG. 14 is a view showing a relationship of users with robots.

FIGS. 14 and 16 show a fourth embodiment of the present invention which is similar to the previous embodiments, and the parts of the fourth embodiment corresponding to those of the previous embodiments are denoted with like numerals without repeating the description of such parts.

Figure 16A:
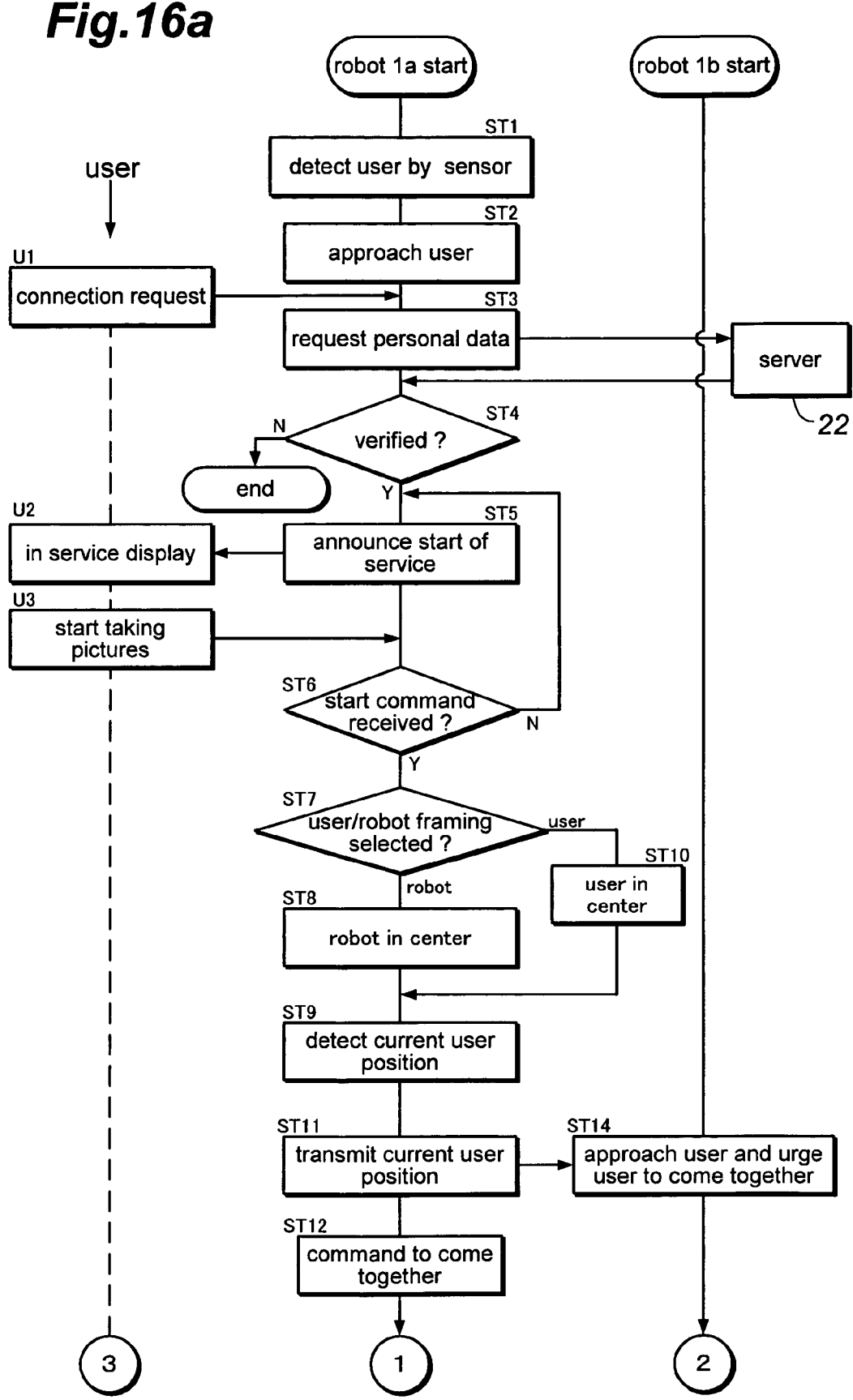
FIGS. 16a to 16c show a flow chart of the control process for the fourth embodiment of the present invention.
Figure 16B:
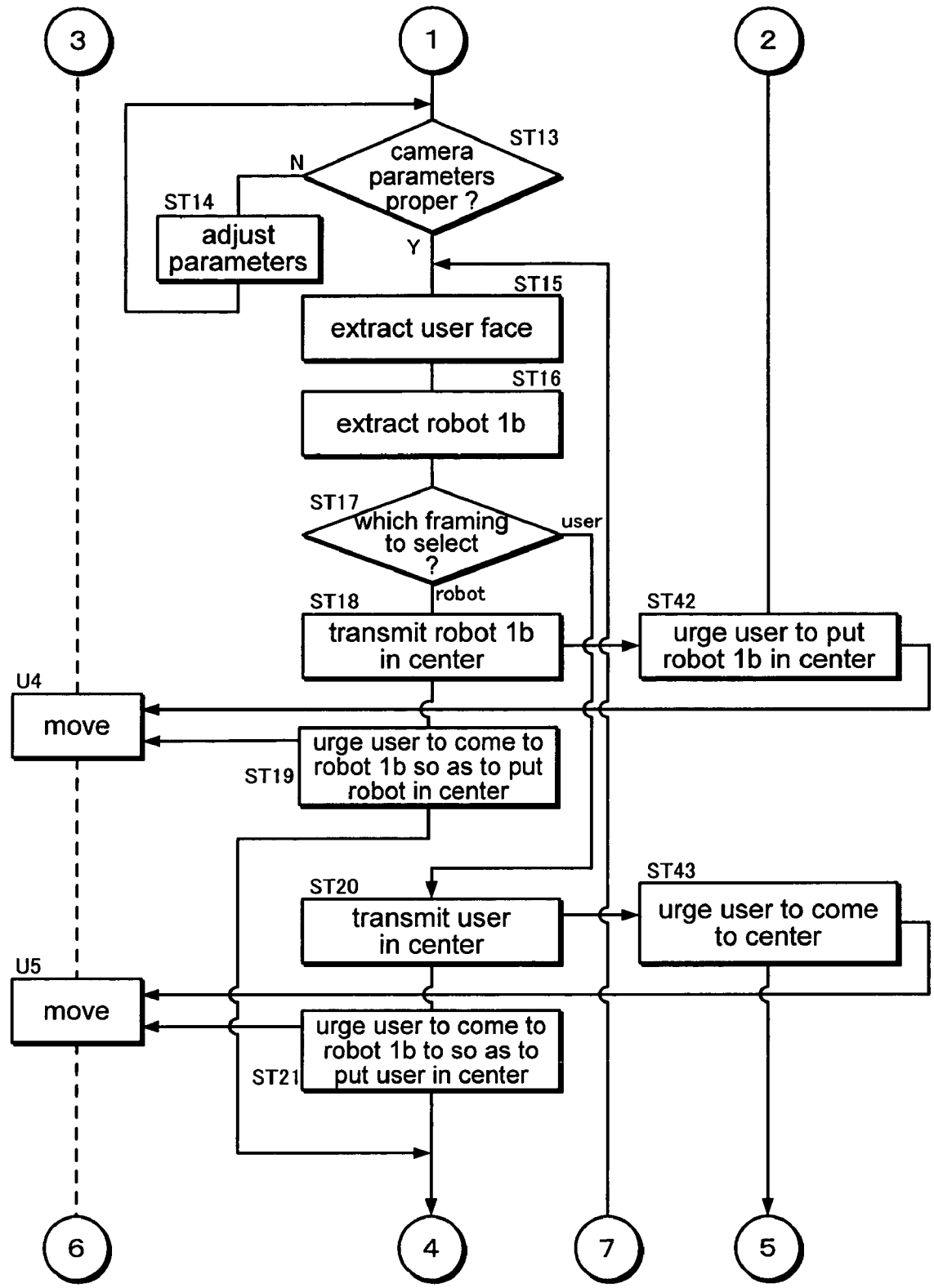
Figure 16C:
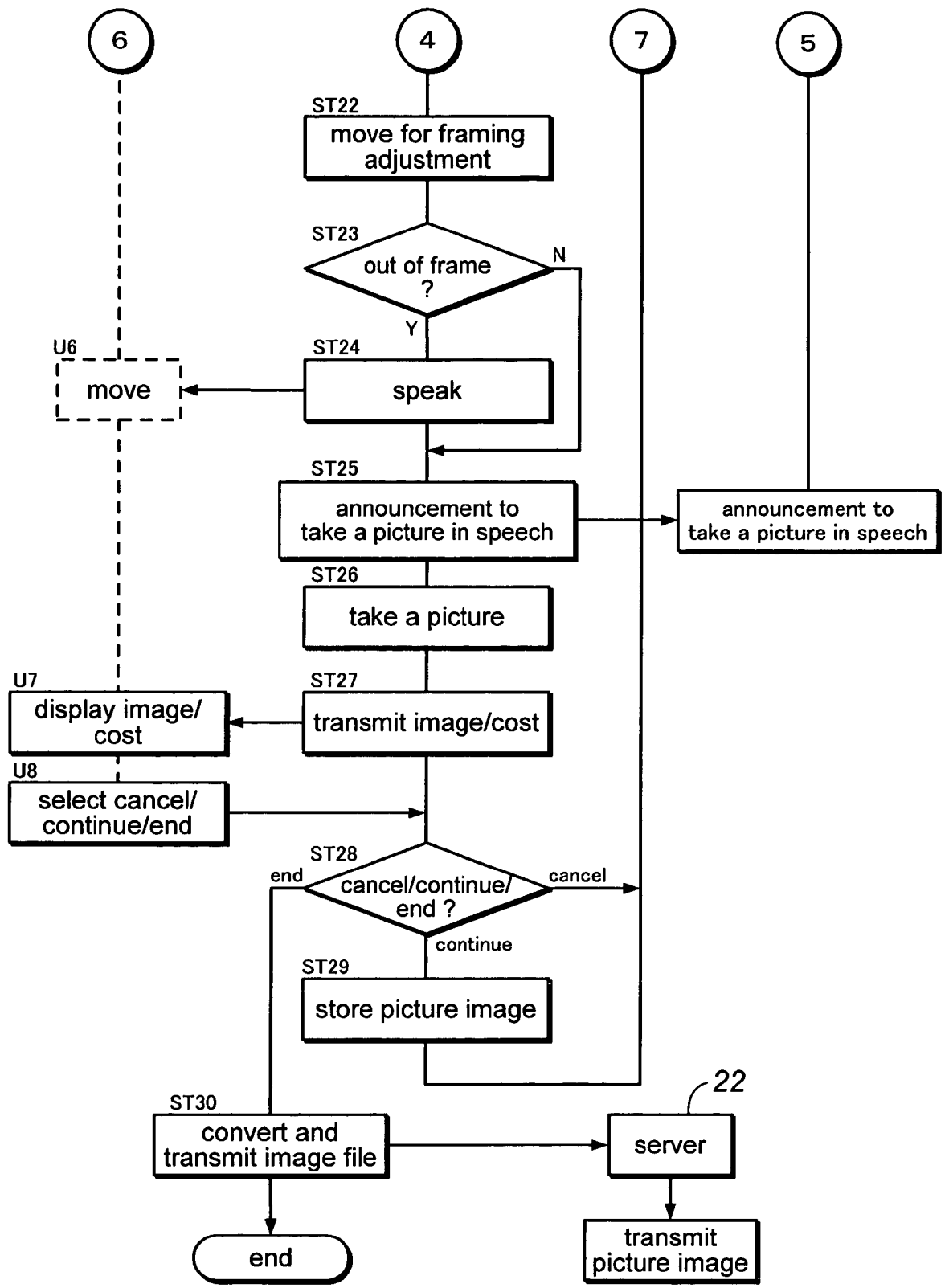

FIGS. 16*a* to 16*c* show the process of a first robot 1*a* taking a picture of a second robot 1*b* with a visitor or user as illustrated in FIG. 14. The first robot 1*a* detects the presence of a human (user) according to the speech recognition and/or image processing or from the output signal of the individual detection sensor 7 which responds to an insignia or transponder given to the user at the time of admission to the site (step ST1). Upon detection of a user, the first robot 1*a* approaches the user. This movement of the first robot 1*a* may be executed in such a manner that the detected user always remains within the viewing angle of the first robot 1*a*. The first robot 1*a* may be equipped with a distance sensor so that the first robot 1*a* may stop once it has come within a certain prescribed distance from the user.

The user is able to see that the first robot 1*a* is coming toward him or her, and may transmit a connection request (request for a picture taking) to the first robot 1*a* from a mobile phone 14 carried by the user at an appropriate timing (U1). This request may be received by the mobile transceiver 15 of the first robot 1*a* via the mobile base station 23 or by the LAN transceiver 13 of the first robot 1*a* via the LAN transceiver 21 and managing server 22. Upon receipt of this request by the mobile transceiver 15 or LAN transceiver 13, the first robot 1*a* transmits a personal data request signal from the LAN transceiver 13 to verify the personal data contained in the connection request (step ST3). Upon receipt of the personal data request signal from the LAN transceiver 21, the managing server 22 compares the ID code contained in the header of the connection request signal from the mobile phone 14 with the personal data registered in the managing server 22, and returns the result of comparison. The comparison result from the managing server 22 is transmitted from the LAN transceiver 21, and received by the LAN transceiver 13 of the first robot 1*a*.

The first robot 1*a* then determines if the ID code of the connection request signal matches with personal data stored in the managing server 22 (step ST4). If there is a match, the program flow advances to step ST5. If there is no match, the current flow is concluded, and the program flow returns to step ST1. The control unit 10 of the first robot 1*a* thus determines if a picture should be taken or not in cooperation with managing server 22.

In step ST5, the first robot 1*a* transmits a notice of coming into service. The transmission signal can be received by the mobile phone 14 via the mobile base station 23. The notice of coming into service is displayed on the display of the mobile phone 14 (U2) to let the user know that the first robot 1a is now ready to receive a request for taking a picture. Once the connection request is accepted (U1), the mobile phone 14 is kept in connection with the mobile base station 23. The transmission signal from the mobile phone 14 may contain the verified ID or personal data, for instance in the header so that the operation of the first robot 1a may not be disrupted by an access from an unauthorized mobile phone or terminal.

When the user has judged that he or she is in a position for the first robot 1a to be able to take a picture, the user presses a prescribed key on the mobile phone 14 to instruct the first robot 1a to start taking a picture (U3). If desired, the first robot 1a may be adapted to be able to receive commands by speech. In such a case, the sound processing unit 6 is required to be able to recognize speech and look up a list of vocabulary. By limiting the kinds of commands, the first robot 1a can readily determine which of the commands it has received.

The first robot 1a determines if a command to take a picture has been received in step ST6. If such a command has been received, the program flow advances to steps ST7. Otherwise, the program flow returns to step ST5 and wait for a command. The first robot 1a may be incorporated with a timer which is set when a command to take a picture was received so that the program flow may return to step ST1 when this timer has timed up although it is not shown in the drawings. Such a fail-safe feature may be provided in appropriate places in the control flow.

In step ST7, the frame layout is selected. For instance, it is decided that the user or a second robot 1b should be in the center of the picture. Such a choice may be made by the user at the time of initial registration or via the image shown on the display of the mobile phone 14 carried by the user on a real time basis. If it is selected that the second robot 1b should be in the center of the picture in step ST7, the program flow advances to step ST8 and this selection is stored in the memory before the program flow advances to step ST9. If it is selected that the user should be in the center of the picture in step ST7, the program flow advances to step ST10 and this selection is stored in the memory before the program flow advances to step ST9.

In step ST9, the current position of the user is identified. It is accomplished by the first robot 1a by looking up the map of the map database unit 11 to identify the current position of the first robot 1a and determining the position of the user relative to the first robot 1a according to the distance to the user and direction thereof identified by the camera 2. Upon identifying the current position of the user, the robot transmits the identified current position of the user via the ALN transceiver 13 in step ST11.

The second robot 1b is also capable of identifying its current position by looking up the map of the map database unit 11. Upon receipt of the current position of the user via the LAN transceiver 13, the second robot 1b approaches the user according to the position information of the user and the current position of itself, and speaks to the user to come close to the second robot 1b as illustrated in FIG. 14 (step ST14). The first robot 1a also speaks to the user to come close to the second robot 1b in step ST12. This speech is synthesized in the sound processing unit 6, and is produced from the loudspeaker 5.

It is determined in step ST13 if the various parameters associated with the camera 2 are appropriate. Such parameters should be selected so as to enable a clear picture to be taken under the existing condition, and can be determined from the CCD output of the camera. When any of the parameters is determined to be improper, the program flow returns to step ST14 where the inappropriate parameter is adjusted before the program flow returns to step ST13. If all the parameters are appropriate, the program flow advances to step ST15.

The face of the user is extracted in step ST15 as described earlier, and the second robot 1b is extracted in step ST16. By knowing the outer profile and color of the second robot 1b, it is possible to extract the second robot 1b without any difficulty.

In step ST17, it is determined what should be placed in the center of the frame. More specifically, according to the information stored in step ST8 or ST10, it is determined if the second robot 1b or the user should be in the center of the frame. When the second robot 1b is to be in the center of the frame, the program flow advances to step ST18, and this fact is transmitted before the program flow advances to step ST19.

Upon receipt of the information that the robot 1b should be in the center of the frame (which was transmitted in step ST18), the second robot 1b speaks to the effect that the user should gather around the robot 1b to put the second robot 1b in the center in step ST42. For instance, the second robot 1b may say, "Gather around me." The first robot 1a may say, "Gather around the robot right next to you." The user moves toward the second robot 1b in response to such invitations (U4).

If it is determined that the user should be in the center of the frame in step ST17, the program flow advances to step ST20, and this fact is transmitted before the program flow advances to step ST21. Upon receipt of the information that the user should be in the center of the frame (which was transmitted in step ST20), the second robot 1b speaks to the effect that the user should be in the center of the group in step ST43. For instance, the second robot 1b may say, "Come to my right." The first robot 1a may say, "Come to the left of the robot right next to you." The user moves to the right of the second robot 1b in response to such invitations (U5).

A framing adjustment is made in step ST22 following step ST19 or ST21. A framing adjustment can be made by adjusting the position of the first robot 1a. Alternatively, the first robot 1a may turn its head. This needs to be only a rough adjustment so as to put the object substantially in the center of the frame in a short period of time without keeping the user waiting for any prolonged period of time.

It is determined in step ST23 if the user and second robot 1b have been put inside the frame as a result of the framing adjustment. If the framing adjustment conducted in step ST22 has failed to put both the user and second robot 1b inside the frame, the program flow advances to step ST24 where the first robot 1a speaks to the user to move to the right or otherwise position the user inside the frame. This message in speech is synthesized by the sound processing unit 6 and is produced from the loudspeaker 5. The user moves as urged by the robot 1 (U6).

If it is determined that the user and second robot 1b are both inside the frame, the program flow advances to step ST25 where the first robot 1a says that it is going to take a picture. Similarly, the second robot 1b says to the user to prepare for a shot.

The first robot 1a takes a picture in step ST26 before the program flow advances to step ST27. In step ST27, the control unit 10 transmits a cost charging data based on a predetermined pricing schedule along with the selected picture image (U7). Such a cost charging process is executed by a program incorporated in the control unit 10.

The selected image and corresponding cost are shown on the display 14a of the mobile phone 14 (U7). The user selects one of the cancel, continue and end commands to command the robot 1 accordingly (U8). The robot 1 may be adapted to follow speech commands such as "cancel", "continue" and "end" spoken by the user.

The robot 1 determines if any one of the cancel, continue or end commands is made in step ST28. When the continue command is selected, the program flow advances to step ST29 where the selected image is stored and the program flow returns to step ST15 to start a new picture taking process. At this time point, the cost charging to the user is made. If the cancel command is selected, the program flow returns to step ST15 to start a new picture taking process. In this case, the captured image is not stored, and no cost charging is made.

When the end command is selected, the program flow advances to step ST30 where the image processing unit 3 and control unit 10 jointly convert the selected image or images into a file format which is convenient for the user to handle and the converted image data is transmitted to the managing server 22 before the picture taking process is concluded. The process for finally ending the selected picture image is executed by a selected image determining means implemented as a program incorporated in the control unit 10.

When there are a plurality of selected picture images, the picture images may be shown on the display 14*a* one after another in a consecutive manner or, alternatively, simultaneously as thumbnail images. Thereby, the user can select the desired picture images one by one while confirming that the selection is correct. If desired, it is also possible to have the selected picture images printed out at a prescribed location for the user to come to this location to pick up the printed copies of the picture images.

The selected picture image may be stored in the managing server 22 in association with the corresponding personal data or may be transferred from the managing server 22 to the database unit 25*a* of the data server 25 via the Internet. Thereby, the user can download the desired picture images from the managing server 22 or data server 23 from the user's personal computer at home via the Internet and, if desired, have it printed by a personal printer. If the user's mail address is registered in the managing server 22 as part of the personal data, it is also possible to transmit the selected picture image to such a mail address. Because the picture images acquired by the first robot 1*a* are successively transmitted to the managing server 22 and are not required to be stored in the robot 1, the robot 1 is capable of taking pictures without the risk of running out of memory space.

Thus, according to the foregoing embodiment, each user can command a first robot to take a picture of the user with a second robot. In particular, through communication between these robots and invitations of these robots to the user, an appropriate frame layout can be accomplished upon command from the user via a mobile terminal such as a mobile phone.

Although the present invention has been described in terms of preferred embodiments thereof, it is obvious to a person skilled in the art that various alterations and modifications are possible without departing from the scope of the present invention which is set forth in the appended claims.

The invention claimed is:

1. An image capturing system for taking a picture of a mobile object, comprising:
a fully autonomous mobile robot, said mobile robot including a wireless transceiver, a camera and a control unit connected to the wireless transceiver and camera; and
a managing server;
wherein said control unit is configured to temporarily store a plurality of picture images obtained by said camera, transmit the obtained picture images to a mobile terminal incorporated with a display via said wireless transceiver, and transmit a selected one of the pictures images to said managing server according to a request signal transmitted from said mobile terminal to said wireless transceiver,
wherein said control unit is provided with a means for detecting a human and having said robot track said human, and is configured to take a picture of said human while tracking said human, and is further configured to determine if the human to be taken a picture of is within a frame of the camera and, if the human is out of the frame, urge the human to move in a direction to come within the frame, and
wherein the mobile terminal is configured to provide to the robot a command of a user to take a picture.

2. An image capturing system according to claim 1, wherein said control unit includes a means for cutting out an image of a face from at least one of the picture images obtained by said camera and a means for adjusting a picture taking parameter of said camera so as to put said face image within a frame.

3. An image capturing system according to claim 1, wherein said control unit is configured to change a position or moving direction of said robot in response to a command from said mobile terminal.

4. An image capturing system according to claim 1, wherein said control unit detects a human as a moving object.

5. An image capturing system according to claim 1, wherein said control unit detects a human by optically or electromagnetically detecting an insignia attached to said human.

6. An image capturing system according to claim 1, wherein said first robot is provided with a means for communicating with a second robot, and said control unit is configured to take a picture of a person requesting a picture taking with said second robot.

7. An image capturing system according to claim 1, wherein said control unit is configured to transmit a background frame for combining with an obtained picture image to the mobile terminal and to superimpose said background frame on the obtained picture image.

8. An image capturing system according to claim 1, wherein said system further comprises a charging station for supplying power to said robot, and said robot is provided with a means for detecting power remaining in said robot and a position of said charging station so that the robot is capable of moving to said charging station and receives a supply of power charge before the power of said robot runs out.

9. An image capturing system according to claim 1, wherein said control unit is configured to detect a personal identification signal in said request from the mobile terminal and accept said request only when an authentic personal identification signal is detected in said request from the mobile terminal.

10. An image capturing system according to claim 1, wherein said control unit charges a cost to the person requesting a picture taking when the selected picture image is transmitted to the managing server.

11. An image capturing system for taking a picture of a mobile object, comprising:
a fully autonomous mobile robot, said mobile robot including a wireless transceiver, a camera and a control unit connected to the wireless transceiver and camera; and
a managing server;
wherein said control unit is configured to temporarily store a plurality of picture images obtained by said camera, transmit the obtained picture images to a mobile terminal incorporated with a display via said wireless transceiver, and transmit a selected one of the pictures images to said managing server according to a request signal transmitted from said mobile terminal to said wireless transceiver; and wherein said control unit is provided with a means for detecting a human and having said robot track said human, and is configured to take a picture of said human while tracking said human, and is further configured to determine if the human to be taken a picture of is within a frame of the camera and, if the human is out of the frame, move to a new position that will put the human within the frame; and wherein the mobile terminal is configured to provide to the robot a command of a user to take a picture.

12. An image capturing system for taking a picture of a mobile object, comprising:

a fully autonomous mobile robot, said mobile robot including a wireless transceiver, a camera and a control unit connected to the wireless transceiver and camera; and a managing server;

wherein said control unit is configured to temporarily store a plurality of picture images obtained by said camera, transmit the obtained picture images to a mobile terminal incorporated with a display via said wireless transceiver, and transmit a selected one of the pictures images to said managing server according to a request signal transmitted from said mobile terminal to said wireless transceiver; and wherein said control unit is provided with a means for detecting a human and having said robot track said human, and is configured to identify a priority assigned to each detected human, and track a human having a higher priority in preference to a human having a lower priority; and wherein the mobile terminal is configured to provide to the robot a command of a user to take a picture.

13. An image capturing system for taking a picture of a mobile object, comprising:

a fully autonomous mobile robot, said mobile robot including a wireless transceiver, a camera and a control unit connected to the wireless transceiver and camera; and a managing server;

wherein said control unit is configured to temporarily store a plurality of picture images obtained by said camera, transmit the obtained picture images to a mobile terminal incorporated with a display via said wireless transceiver, and transmit a selected one of the pictures images to said managing server according to a request signal transmitted from said mobile terminal to said wireless transceiver; and wherein said control unit is provided with a means for detecting a human and having said robot track said human, and is configured to take a picture of said human while tracking said human; and wherein the mobile terminal is configured to provide to the robot a command of the human, who is being tracked by the robot, to take a picture.

14. An image capturing system for taking a picture of a mobile object, comprising:

a first fully autonomous mobile robot, said first mobile robot including a wireless transceiver, a camera and a control unit connected to the wireless transceiver and camera; and a managing server;

wherein said control unit is configured to temporarily store a plurality of picture images obtained by said camera, transmit the obtained picture images to a mobile terminal incorporated with a display via said wireless transceiver, and transmit a selected one of the pictures images to said managing server according to a request signal transmitted from said mobile terminal to said wireless transceiver; and wherein said control unit is provided with a means for detecting a human and having said robot track said human, and is configured to take a picture of said human while tracking said human; and wherein said first mobile robot is provided with a means for communicating with a second fully autonomous mobile robot, and said control unit is configured to take a picture of a person requesting a picture-taking with said second robot.

* * * * *